United States Patent [19]
Saito et al.

[11] Patent Number: 5,742,855
[45] Date of Patent: Apr. 21, 1998

[54] PHOTOGRAPHIC AND VIDEO IMAGE SYSTEM

[75] Inventors: Takahiko Saito, Kanagawa; Akira Nakanishi; Shunzi Obayashi, both of Tokyo; Hideki Toshikage, Saitama, all of Japan

[73] Assignee: Sony Corporation, Tokyo, Japan

[21] Appl. No.: 726,581

[22] Filed: Oct. 7, 1996

Related U.S. Application Data

[60] Division of Ser. No. 445,772, May 22, 1995, Pat. No. 5,652,643, which is a continuation-in-part of Ser. No. 329,546, Oct. 26, 1994, Pat. No. 5,583,591, which is a continuation-in-part of Ser. No. 26,415, Mar. 4, 1993, abandoned.

[30] Foreign Application Priority Data

Mar. 17, 1992 [JP] Japan ................. 4-060684
Mar. 23, 1992 [JP] Japan ................. 4-065304

[51] Int. Cl.$^6$ ....................................... G03B 17/24
[52] U.S. Cl. .................. 396/311; 396/429; 396/435; 355/40
[58] Field of Search ................ 355/40, 39, 50, 355/55; 396/311, 435, 429

[56] References Cited

U.S. PATENT DOCUMENTS 4,650,304 3/1987 Harvey.
5,382,508 1/1995 Ikenoue.
5,453,815 9/1995 Yoshikawa.
5,471,265 11/1995 Shibata et al. ................. 355/40
5,526,255 6/1996 Shenk ........................... 355/55
5,583,610 12/1996 Yoshikawa ..................... 355/40

FOREIGN PATENT DOCUMENTS 0212443 3/1987 European Pat. Off..

Primary Examiner—David M. Gray
Attorney, Agent, or Firm—Jay H. Maioli

[57] ABSTRACT

A photographic and video image system for transforming an image on a frame of a photographic film includes a structure in the overall form of a photographic printer having an image transformation element that transforms an optical image from the film into a video signal, a frame position indicator, which can be a hole or an optical or magnetic signal, is recorded on the film along with aspect information relating to the size of the frame exposed on the film. The frame position indicator and aspect information are detected and used to control a film feeding operation and the optical image to video signal transformation operation. The user of the system can record order information on the film that is used to specify the aspect of the resultant photographic print, as well as the quantity of prints to be made. Such order information can be superimposed as a menu on a displayed video signal at the time the video signal is reviewed prior to producing a photographic print.

15 Claims, 26 Drawing Sheets

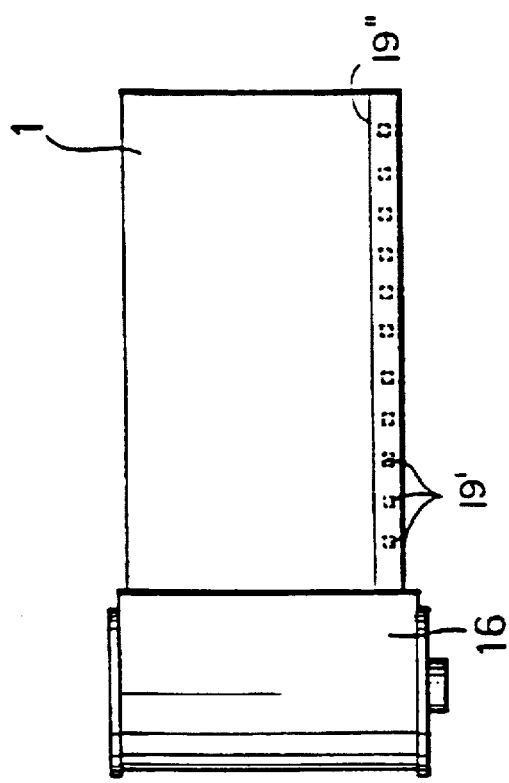
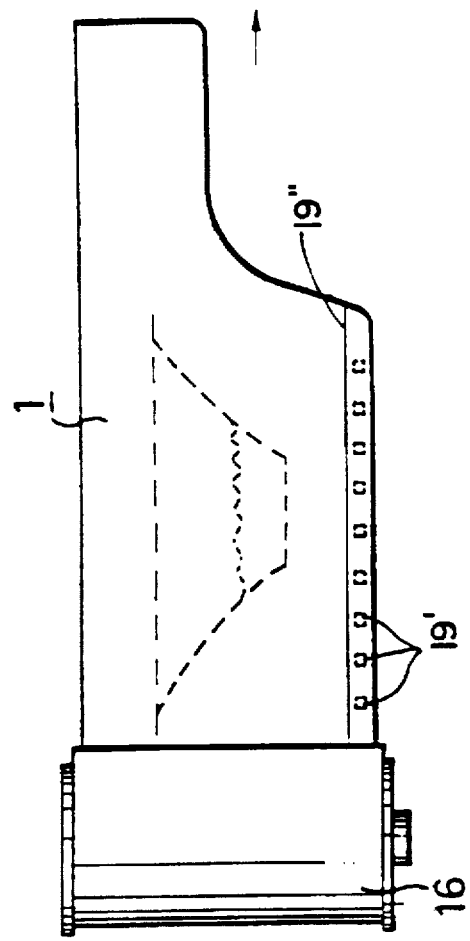

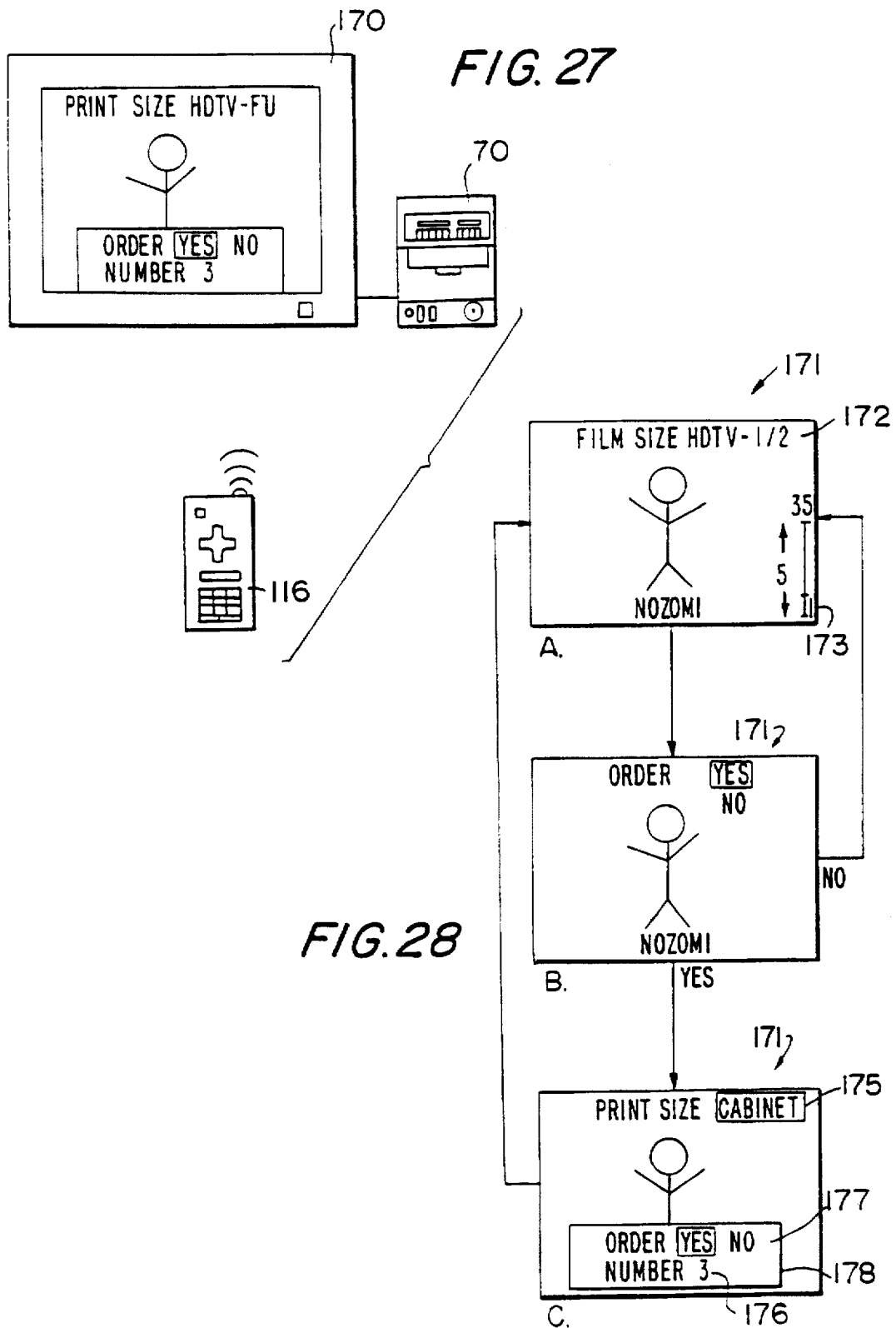

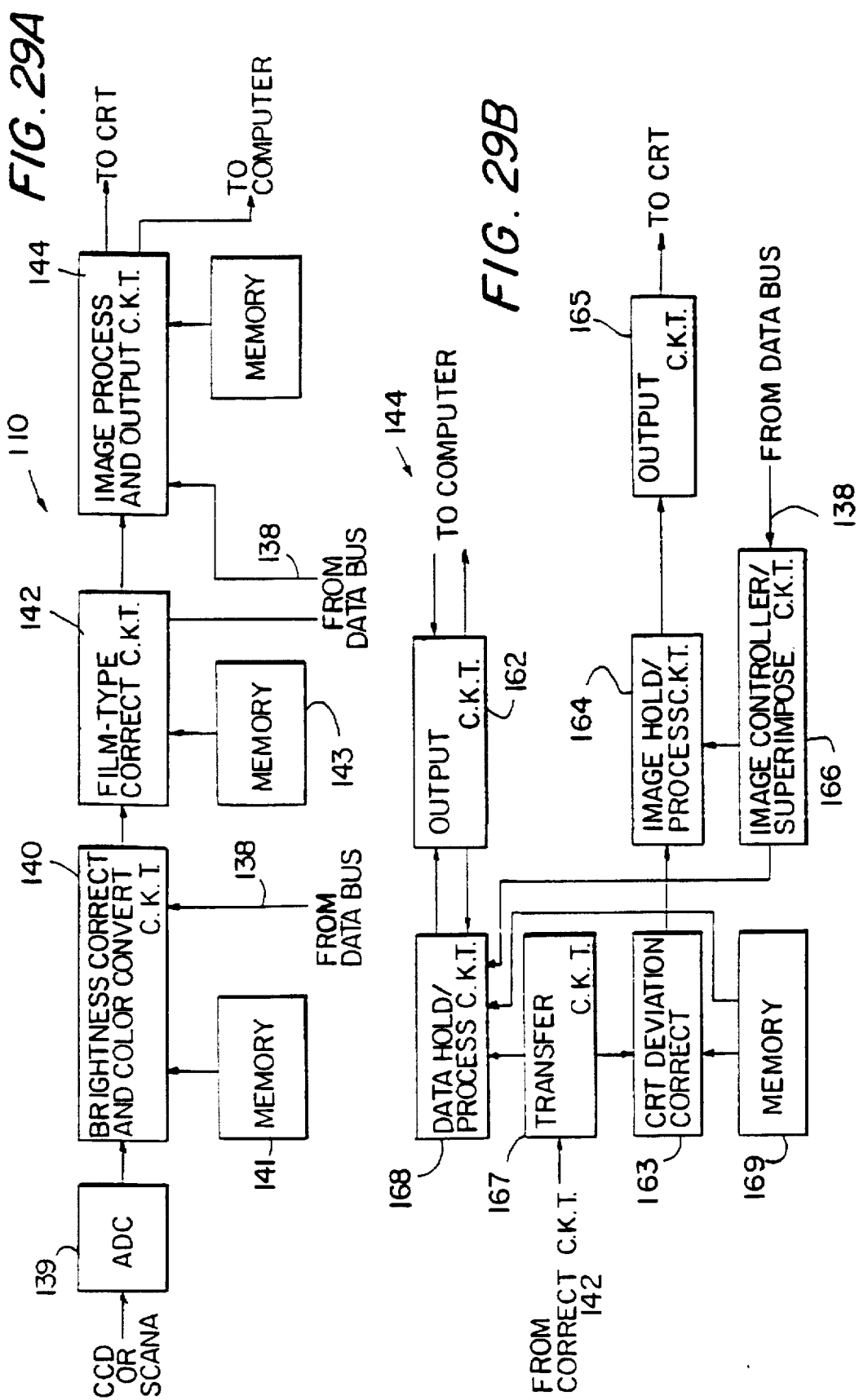

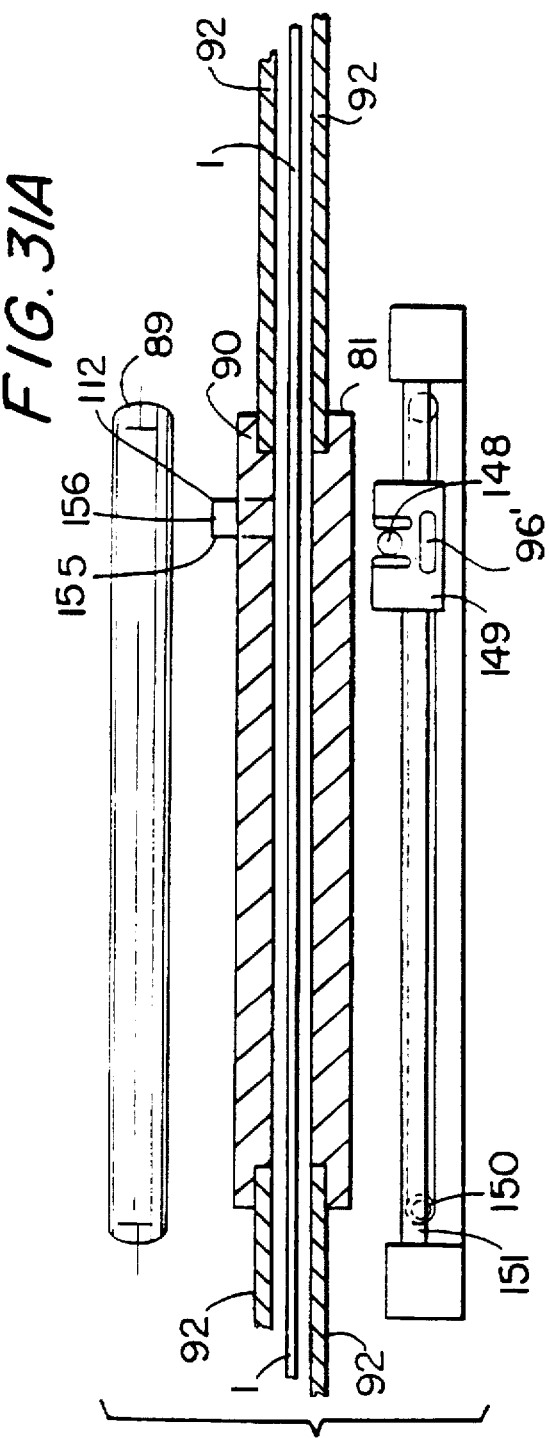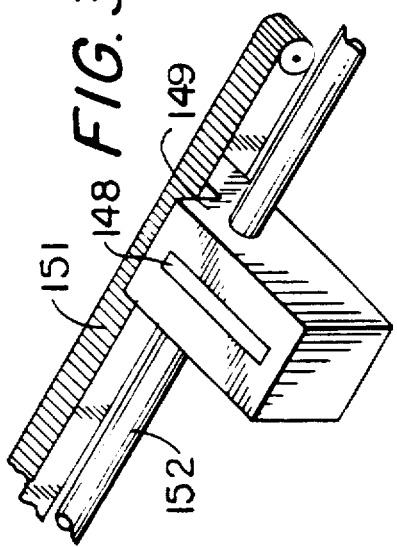

PHOTOGRAPHIC AND VIDEO IMAGE SYSTEM

This application is a division of application Ser. No. 08/445,772 filed May 22, 1995, now U.S. Pat. No. 5,652, 643, which is a continuation in part of application Ser. No. 08/329,546 filed Oct. 26, 1994, now U.S. Pat. No. 5,583, 591, which is a continuation in part of application Ser. No. 08/026,415 filed Mar. 4, 1993, now abandoned.

BACKGROUND OF THE INVENTION

1. Field of the Invention

The present invention relates to a photographic camera system for producing pictures having various frame sizes, and more particularly to a photographic camera using a specialized photographic film and a film printing device for printing the processed photographic film having a succession of frames of different sizes that have been photographed by the camera.

2. Description of the Background

The photographic film that is in the most widespread use today is 35-mm film (system 135) as provided for by Japanese Industrial Standards (JIS) and International Organization of Standardization (IOS).

U.S. Pat. No. 5,049,908 describes a photographic camera and a film therefor, with the film being of a 35-mm size devoid of sprocket holes of the size used in present 35-mm films and having an effective image area of about 30 mm across the film, thereby providing an increased effective usable film area.

More specifically, ignoring dimensional tolerances, present 35-mm films for use in general photography have a width of 35 mm between opposite longitudinal edges and include a series of film-transport perforations or sprocket holes defined along the opposite longitudinal edges of the film. The film-transport perforations are spaced 25 mm across the film and have a pitch of 4.75 mm. Frames on such a present 35-mm film are of a rectangular shape having a width of 25 mm across the film and a length of 36 mm along the film. The frames have a pitch of 38 mm, which is eight times larger than the pitch of the film-transport perforations.

As described in U.S. Pat. No. 5,049,908, some modern photographic film cameras are electronically controlled to provide motor-driven operation with high accuracy, and it has been experimentally confirmed that the film can be transported quite accurately without requiring the large sprocket wheels and film perforations that are found in most present cameras and films. In the system described in U.S. Pat. No. 5,049,908, the film-transport perforations are not present in the 35-mm photographic film, thereby increasing the available frame width across the film up to the regions where such film-transport perforations were located. The proposed film thus has an increased effective image area for improved image quality. This patent describes four sizes that are available for frames that can be exposed on a 35-mm film free of film-transport perforations.

According to one size, a frame that can be exposed in an effective image area of the 35-mm film has a width of 30 mm across the film and a length of 40 mm along the film. The frames of such a size have a pitch of 42.0 mm, for example. The frame size and pitch are selected to match specifications of the present television broadcasting system, for example, the NTSC system. Therefore, the frames have an aspect ratio of 3:4.

Another frame size described in that patent is based on High-Definition Television (HDTV) specifications, in which frames have a width of 30 mm and a length of 53.3 mm and a pitch of 57.75 mm, for example. The aspect ratio of the frames having that size is 9:16.

The above-mentioned frame sizes are full-frame sizes, and the other two frame sizes are half-frame sizes. According to one of the half-frame sizes, frames have a width of 30 mm and a length of 22.5 mm and a pitch of 26.2 mm, for example, to match present television broadcasting system specifications. According to the other half-frame size, frames have a width of 30 mm and a length of 16.9 mm and a pitch of 21.0 mm, for example, to match HDTV specifications.

Film with the above four frame formats is stored in the same film cartridge as presently available 35-mm film.

Because the frames in either of the above frame formats have a width of 30 mm, there are unexposed areas of about 2.5 mm between the frames and along the opposite longitudinal edges of the film. These unexposed areas may be used to keep the film flat, control the film, and write and read data when taking pictures.

The proposed camera may be relatively small and lightweight, because it does not require film-transport sprocket wheels.

Films that are actually collected in processing laboratories are processed either simultaneously in a batch or individually. In a simultaneous batch process, several thousand films are processed per hour at a high rate to realize economics of scale for reducing the printing cost. Specifically, a plurality of exposed films are collected in the processing laboratory and are spliced end to end to form a long, continuous film strip, which is then stored in a film magazine and subsequently processed.

If the films that are spliced into the continuous strip contain frames exposed in different frame formats, such as disclosed in U.S. Pat. No. 5,049,908, then the long single film stored in the film magazine contains different frame sizes, thereby making printing a problem.

U.S. Pat. Nos. 4,384,774 and 5,066,971 propose cameras capable of switching between half and full frame sizes at the time the film is exposed. When film exposed using these proposed cameras is spliced into a long, single, film strip for simultaneous batch processing, the continuous film strip also contains different frame sizes.

The processing laboratories are therefore required to form notches indicative of frame centers for automatically printing spliced films with different frame sizes after they are developed. For example, as disclosed in U.S. Pat. No. 4,557,591, a human operator manually notches a side edge of a spliced film and, hence, the notches are required to control the feed of the film. With the disclosed process, it is impossible to process several thousand films per hour, however, the cost of processing exposed film is relatively high. As a consequence, films with different frame sizes may not be accepted by processing laboratories in Japan.

Many processing laboratories all over the world also do not accept films with frames exposed in half size because they do not want different frame sizes to be contained in a single spliced film that is stored in a single film magazine for subsequent processing and printing. This problem arises because the different frame sizes can be recognized only after the film has been developed. One solution would be to apply marking seals to exposed films so that the films of different frame sizes thereof can be distinguished and sorted out for individual processing and printing. Nevertheless, use of marking seals would not essentially solve the problem, because it would be difficult to supply such marking seals consistently over a number of years.

OBJECTS AND SUMMARY OF THE INVENTION

Accordingly, it is an object of the present invention to provide a variable frame size photographic system that can eliminate the above-noted drawbacks inherent in prior proposed systems.

It is another object of the present invention to provide a photographic and video system that can provide a video display of an image on a photographic film prior to printing the image.

Another object of the present invention is to provide a photographic film printer for automatically printing successive photographic films in response to order information recorded on the photographic film by the user.

According to one aspect of the present invention, there is provided a photographic and video system including a photographic printer body, a film feed device for feeding the photographic film, an image transforming device disposed on the printer body for transforming a photographic image into a video signal, a detecting device disposed on the printer body for detecting position indicator that is a hole or was optically or magnetically recorded on the photographic film and for detecting aspect information that was recorded on the film, and a film feed control device disposed on the printer body for controlling feeding of the photographic film in response to the frame position indicator detected by the detecting device and for controlling the image transforming device in response to the aspect information detected by the detecting device.

According to another aspect of the present invention, there is also provided a photographic image apparatus for transforming an image on a frame of photographic film into a video signal for display prior to making a photographic print of the image, including a film feed device for positioning the photographic film at a printing location, a detector for detecting frame aspect information recorded on the film and generating an aspect information signal, an image transformer for transforming an optical image into a video signal, and a superimposing display for displaying the video signal mixed with the aspect information signal. The display of the video signal can be controlled based on the detected aspect information.

The present invention in another aspect also provides a photographic film printer including a printer body, a device for transforming an image on the film into a video signal, and a device for permitting a user to input print order information that is recorded on the film. Aspect information concerning the size of the exposed frame is also recorded on the film. The order information is used to produce the desired size and quantity of prints and the aspect information controls variable opening masks in the printer.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIGS. 4A and 4B are elevational views of 35-mm film cartridges that can be used in another embodiment of the 35-mm photographic camera of the present invention;

FIG. 27 is a pictorial representation of a video monitor connected to the photographic and video system of FIG. 22;

FIG. 28 is a representation of video screens showing the graphical menu used with the system of FIG. 22 to select a photographic print size;

FIG. 29A is a schematic in block diagram form of an image process circuit, and FIG. 29B is a schematic in block diagram form showing the image process output circuit of FIG. 29A in more detail;

FIGS. 31A and 31B are pictorial representations of an other embodiment of the present invention using a line scanner and sensor system.

DETAILED DESCRIPTION OF PREFERRED EMBODIMENTS

Figure 1:
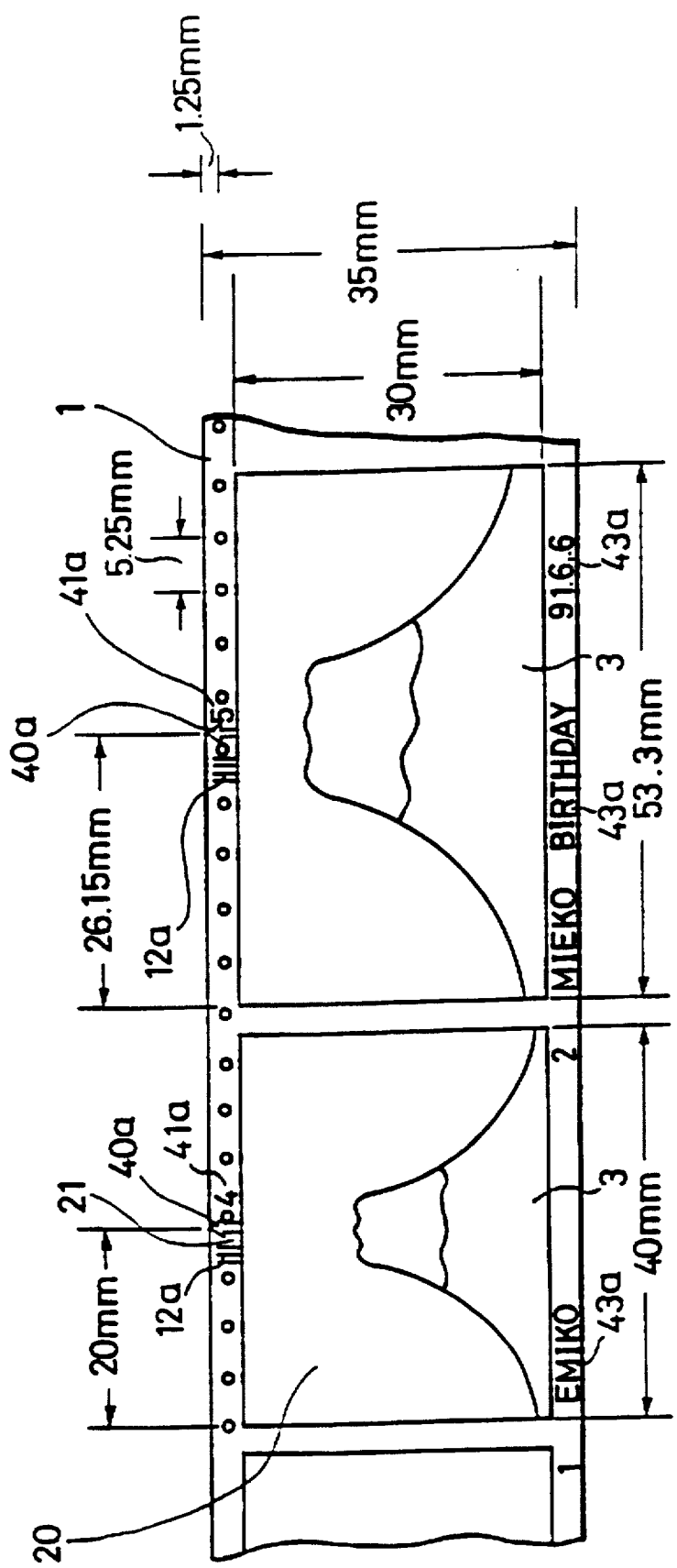
FIG. 1 is a fragmentary front elevational view of a 35-mm film that has been exposed using a 35-mm photographic camera according to an embodiment of the present invention.
Figure 2:
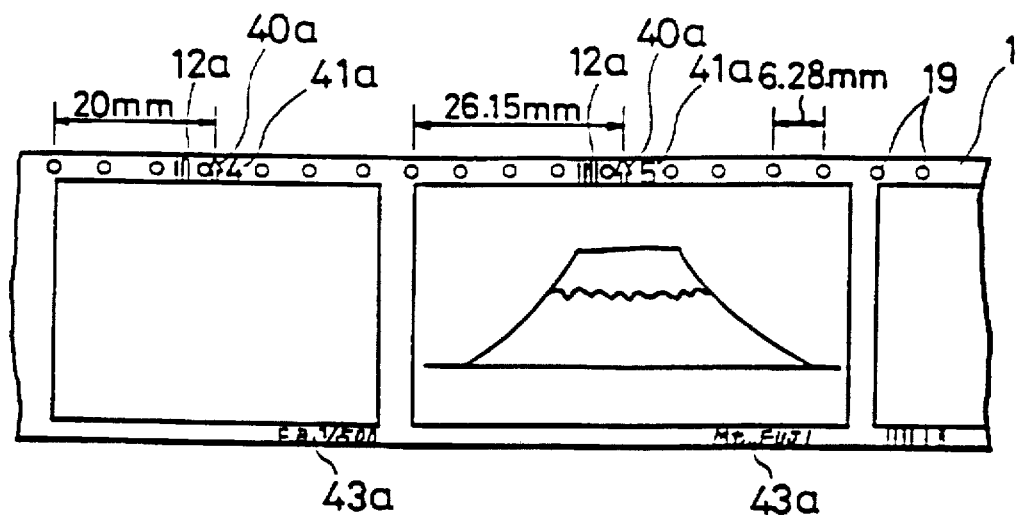
FIG. 2 is a fragmentary front elevational view of another 35-mm film that has be en exposed using an embodiment of the 35-mm photographic camera of the present invention.
Figure 3A:
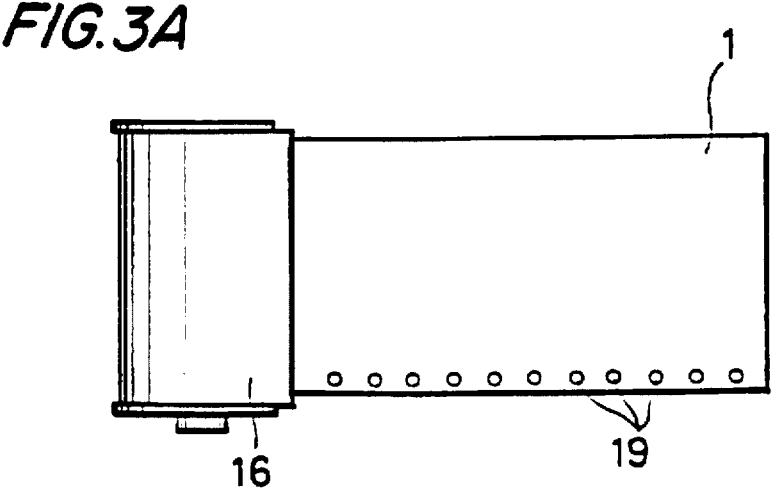
FIGS. 3A and 3B are elevational views of 35-mm film cartridges that can be used in one embodiment of the 35-mm photographic camera of the present invention.
Figure 3B:
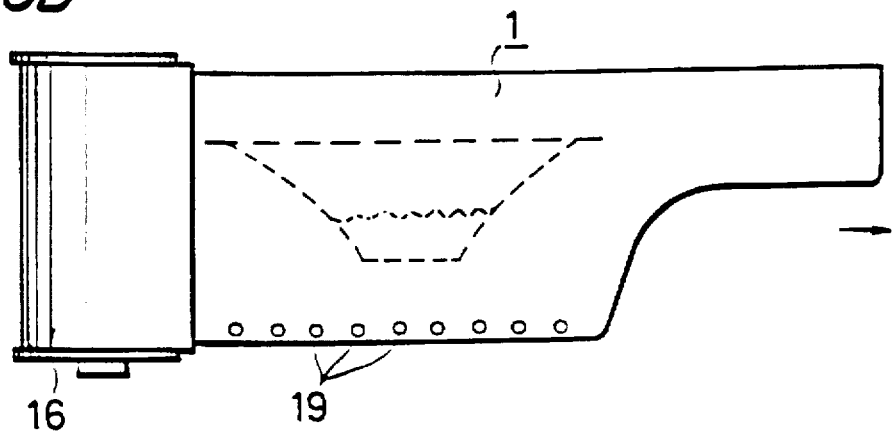

A 35-mm photographic film 1 that can be used in a 35-mm photographic camera according to the present invention is described with reference to FIGS. 1, 2, 3A, and 3B, in which FIGS. 1 and 2 show 35-mm photographic film 1 after it has been exposed, and FIGS. 3A and 3B show 35-mm photographic film 1 before being exposed.

As shown in FIGS. 3A and 3B, the 35-mm photographic film 1 is stored in a film cartridge 16 and has an end extending out of the film cartridge 16. Images that are photographed on the 35-mm photographic film 1 are turned upside down by the lenses, so that the upper end of an image is positioned on a lower portion of the photographic film 1. FIG. 3B shows by way of example a photographed image of a subject in broken lines, which appears to be turned upside down on the photographic film 1.

Each of the photographic films 1 shown in FIGS. 1, 2, 3A, and 3B has a series of film position detecting holes 19 defined along an unexposed marginal edge area thereof, which has a width of about 2.5 mm. This unexposed marginal area is used to control the film, to magnetically or optically read or write data, and when taking a picture. The film position detecting holes 19 have a diameter of about 1 mm and are spaced at a constant, predetermined pitch. The pitch of the film position detecting holes 19 in the photographic film 1 shown in FIG. 1 is 5.25 mm, for example, and the pitch of the film position detecting holes 19 in the photographic film 1 shown in FIG. 2 is 6.28 mm.

The film position detecting holes 19 can be replaced by magnetic marks 19' spaced at a predetermined constant pitch and made by a suitable magnetic head on a magnetic edge portion 19" formed on the unexposed film. The magnetic marks 19' are shown as broken lines on the magnetic strip 19" in FIGS. 4A and 4B, because they are not actually visable. Alternatively, the marks 19' could be formed as small dots of magnetic material, such as iron oxide or a transparent magnetic material, deposited on the unexposed film and detected by the magnetic head. The other side of the marginal area that is defined by holes 19 or magnetic marks 19', 19", as shown in FIGS. 1–4, can be used for an order information area as described below. This order information area is recorded by the photographic image system and used in the photographic and video printing system.

Distances by which the different photographic films 1 with the film position detecting holes 19 or magnetic marks 19' spaced at the pitches of 5.25 mm and 6.28 mm are advanced to feed frames of different frame sizes are given in Table 1 below.

TABLE 1

| Frame sizes (Width × length) | Pitch – 6.28 mm | Pitch = 5.25 mm |
|---|---|---|
| NTSC-matched frame size (30 mm × 40 mm), full size | 43.96 = 6.28 × 7 pitches | 42.0 = 5.25 × 8 pitches |
| HDTV-matched frame size (30 mm × 53.3 mm), full size | 56.52 = 6.28 × 9 pitches | 57.75 = 5.25 × 11 pitches |
| HDTV-matched frame size (30 mm × 16.9 mm), half size | 18.84 = 6.28 × 3 pitches | 21.0 = 5.25 × 4 pitches |
| NTSC-matched frame size (30 mm × 22.5 mm), half size | 25.12 = 6.28 × 4 pitches | 26.25 – 5.25 × 5 pitches |

The photographic film 1 shown in FIG. 3A has film position detecting holes 19 that will be positioned along an upper marginal edge area after the photographic film is exposed, however, no tongue is provided at the leading end, so that no tongue-removing process will subsequently be required. Because no tongue-removing process will be required, the subsequent processing of the photographic film 1 is less costly. This applies to the film shown in FIG. 4A as well.

The photographic film 1 shown in FIG. 3B also has film position detecting holes 19 that will be positioned in an upper marginal edge area thereof after the photographic film is exposed, and has a tongue at its leading end on its lower portion. The tongue at the leading end of the photographic film 1 is vertically opposite in position to the tongue of an ordinary 35-mm photographic film that is now generally commercially available. If a photocoupler is used in a photographic camera for detecting the film position detecting holes 19, then when the photographic film 1 is loaded into the photographic camera, the marginal edge with the film position detecting holes 19 is not required to be manually inserted into the photocoupler, but is automatically inserted into the photocoupler when the photographic film 1 is wound by a film transport mechanism in the photographic camera. This also applies to the film shown in FIG. 4B.

Figure 5:
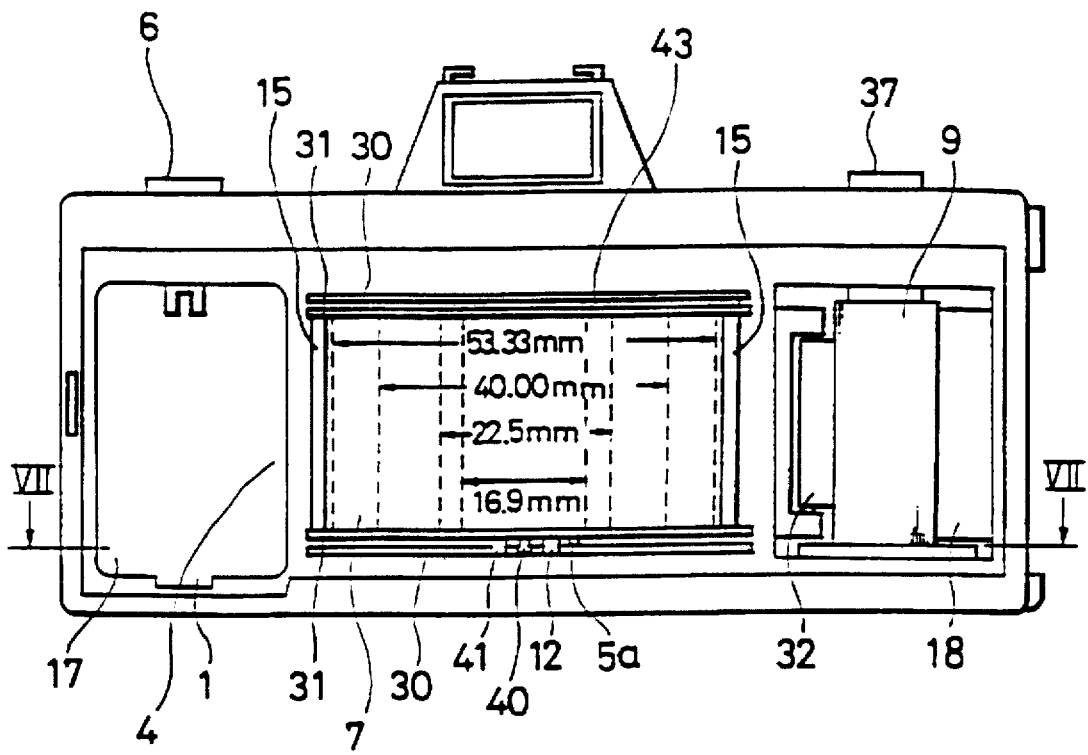
FIG. 5 is a rear elevational view of the 35-mm photographic camera of one embodiment of the present invention with a rear lid removed.
Figure 6:
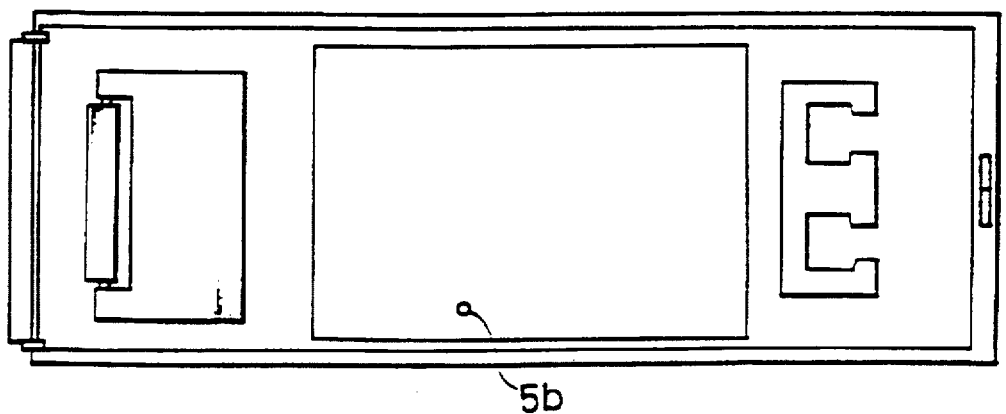
FIG. 6 is an elevational view of an inner surface of a rear lid of the 35-mm photographic camera of FIG. 5.

An embodiment of a photographic camera that can use the photographic films 1 shown in FIGS. 1, 2, 3A, and 3B is shown and described with reference to FIGS. 5 through 8 and 10. FIG. 5 is a rear elevation of the photographic camera with the rear lid or cover removed. The lid is shown in FIG. 6. The photographic camera has a dark box 4 including a cartridge housing 17 for housing the film cartridge 16, which is of a known structure, an exposure opening 7 near the cartridge housing 17 and through which the photographic film 1 can be exposed to light passing through a camera lens, aperture, and shutter not shown in FIG. 5, and a film housing 18 for housing the photographic film 1 after it has been exposed.

The photographic film 1 that is unwound from the film cartridge 16 housed in the cartridge housing 17 is fed over the exposure opening 7 while being transversely limited in motion by upper and lower respective pairs of film guides 30, 31, and is then moved into the film housing 18 after being exposed.

Figure 8:
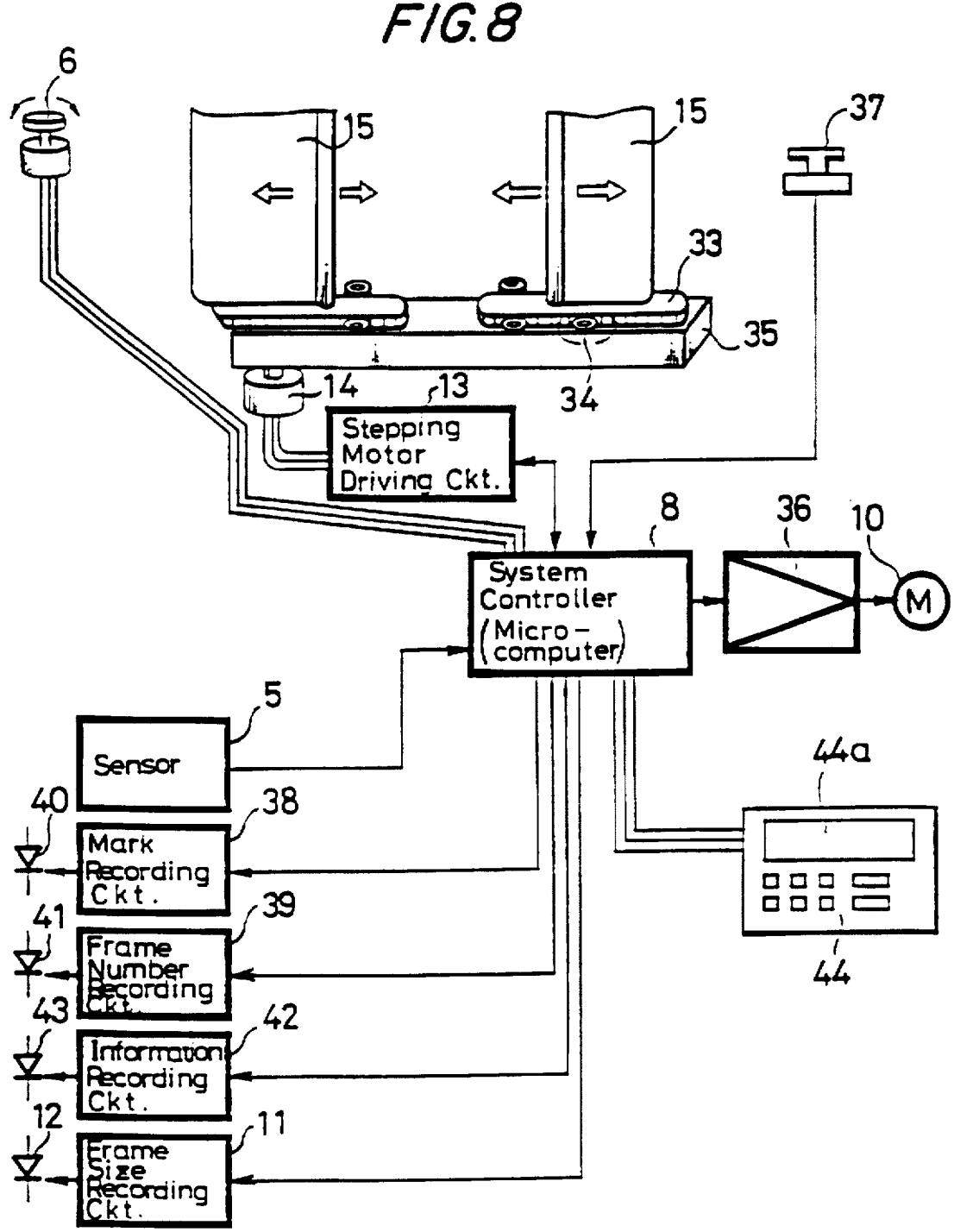
FIG. 8 is a block diagram of a control system for one embodiment of the 35-mm photographic camera according to the present invention using the film of FIGS. 3A and 3B.

The film housing 18 has a guide roller 32 for automatically setting or loading the photographic film 1, and a film take-up spool 9 rotatable by a motor, shown at 10 in FIG. 8, for winding the exposed photographic film 1 thereon.

The photographic camera has a light-emitting diode (LED) 5a positioned between the lower film guides 30, 31 for detecting the film position detecting holes 19, and a photodetector, shown in FIG. 6 at 5b, disposed on a pressure plate of the rear lid and positioned in registry with the LED 5a across the photographic film 1. The photodetector 5b has a diameter of 1.5 mm, for example.

The LED 5a emits infrared radiation having a wavelength of 940 nm, which is different from those radiation wavelengths to which the photographic film 1 is sensitive. Referring to FIG. 8, the LED 5a and the photodetector 5b jointly make up a hole sensor 5 that applies an output signal to a counter in a system controller 8 that comprises a microcomputer. In this way, the system controller 8 can recognize the position of the photographic film 1 over the exposure opening 7. The LED 5a and the photodetector 5b may be alternatively replaced with a photocoupler that also comprises an LED and a photodetector but which are positioned in confronting relationship, as described hereinbelow.

Figure 9:
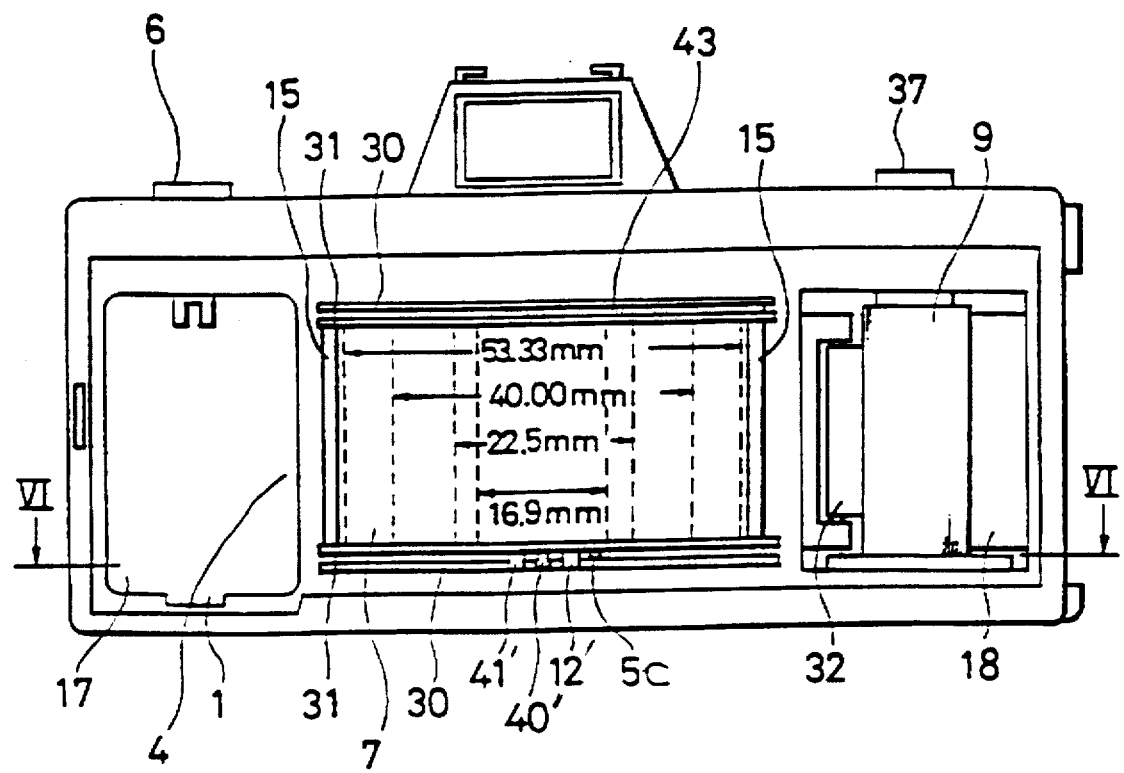
FIG. 9 is a rear elevational view of the 35-mm photographic camera of another embodiment of the present invention with the rear lid removed.

Alternatively, as shown in FIG. 9 the LED 5a can be replaced by a magnetic head 5c that operates to sense the magnetic marks 19', shown in FIGS. 4A and 4B, that are on the marginal edge area 19" of the unexposed film.

In FIG. 5, the exposure area opening 7 has its size defined by left and right movable masks 15 that are laterally movable over the width of the exposure opening 7 from opposite sides thereof. The size of the exposure opening 7 in the longitudinal direction of the photographic film 1 can selectively be changed to four different dimensions of 53.33 mm, 40.00 mm, 22.5 mm, and 16.90 mm as indicated by the four pairs of broken lines in FIG. 5.

Figure 7:
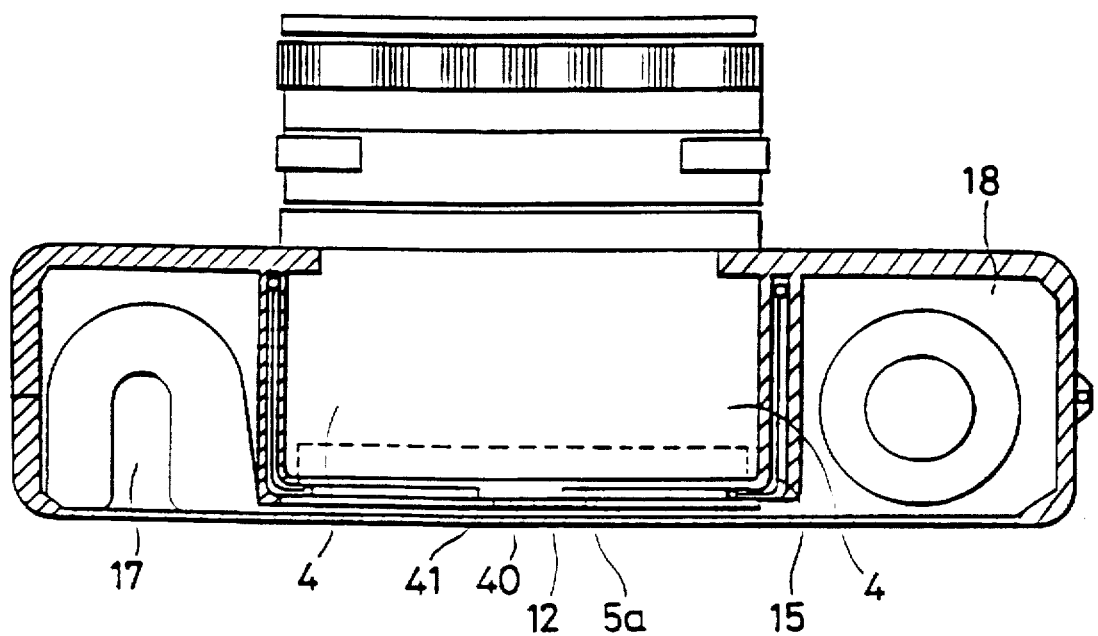
FIG. 7 is a cross-sectional view taken along line VII—VII of FIG. 5.
Figure 10:
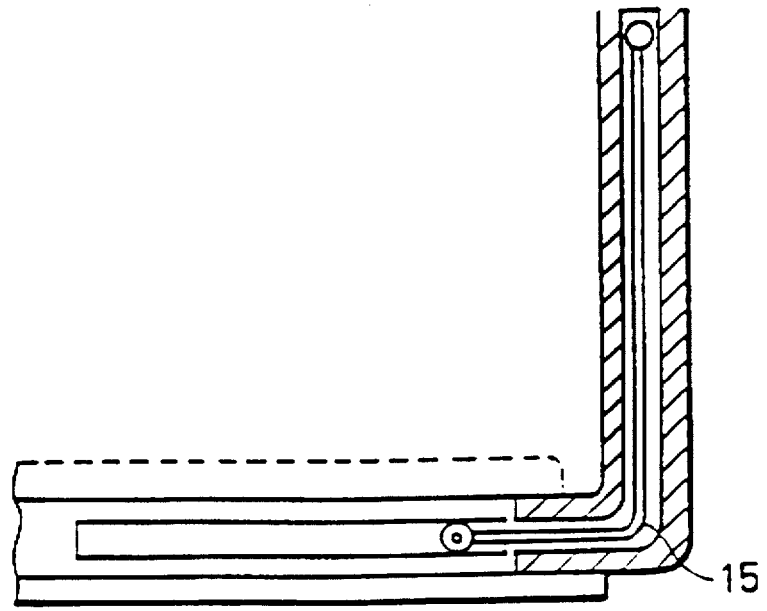
FIG. 10 is an enlarged fragmentary view of a portion of the camera shown in FIG. 7.

As shown in FIGS. 7 and 10, the left and right movable masks 15 are retractable into left and right side walls, respectively, that are positioned on opposite sides of the exposure opening 7 and extend substantially perpendicularly to the photographic film 1 as it extends over the exposure opening 7. As shown in FIG. 8, two linear toothed bars 33 are attached to the respective lower edges of the movable masks 15 and held in mesh with respective drive feed gears 34 of a gearbox 35, much like a rack and pinion assembly. When the gears 34 of the gearbox 35 are driven to rotate the linear toothed bars 33, and hence the movable masks 15, are linearly moved over the exposure opening 7.

As shown in FIGS. 5 and 7, the photographic camera has a frame size setting switch 6 which can manually be turned by the user of the camera to produce a command signal indicative of a selected frame size which is one of the frame sizes described above in Table 1. When the user selects a frame size with the frame size setting switch 6, the frame size setting switch 6 applies a command signal to the system controller 8, which then supplies a control signal to achieve the desired frame size through a stepping motor driving circuit 13 to a stepping motor 14. The stepping motor 14 is energized to rotate the feed gears 34 to move the movable masks 15. At the same time that the movable masks 15 move, the hole sensor 5 produces and supplies a detected film position signal to the system controller 8, which processes the supplied film position signal to generate a control signal. The system controller 8 then supplies the control signal through an amplifier 36 to a motor 10, which rotates the film spool 9 to take-up the photographic film 1 over a predetermined length.

At this time, the length over which the photographic film 1 is driven corresponds to the distance that is determined by the frame size setting switch 6. The feeding of the photographic film 1 is described below with reference to FIGS. 11A through 11E, which show examples in which the hole pitch is 6.28 mm and the photographic film 1 is to be exposed in an HDIV-matched full-frame size of 30 mm×53.3 mm and an NTSC-matched full-frame size of 30 mm×40 mm.

Figure 11:
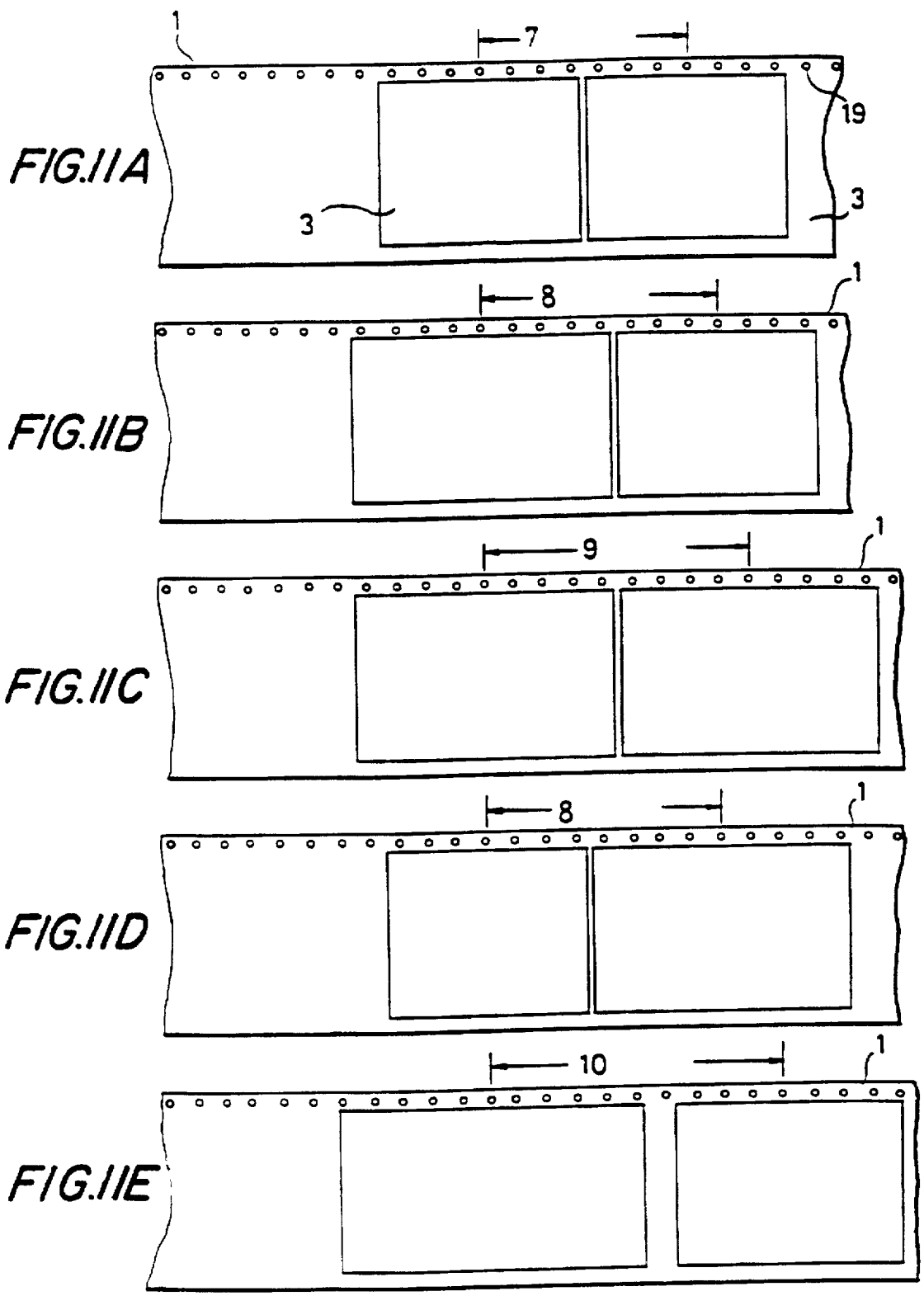
FIGS. 11A through 11E are fragmentary front elevational views showing the positional relationships of frames exposed on a 35-mm film using the embodiment of the 35-mm photographic camera according to the present invention.

FIG. 11A shows a portion of the photographic film 1 as it is exposed in successive NTSC-matched full frames. When the photographic film 1 is fed for seven pitches of the holes 19, a frame area of 30 mm×40 mm is made available for exposure through the exposure opening 7. To switch from an NTSC-matched full-frame size to an HDTV-matched full-frame size, the photographic film 1 is fed for eight pitches of the holes 19, as shown in FIG. 11B, to make a frame area of 30 mm×53.3 mm available for exposure through the exposure opening 7. To expose the photographic film 1 in successive HDTV-matched full frames, the photographic film 1 is fed for nine pitches of the holes 19, as shown in FIG. 11C, to make a frame area of 30 mm×53.3 mm available for exposure through the exposure opening 7. To switch from an HDTV-matched full-frame size to an NTSC-matched full-frame size, the photographic film 1 is fed for eight pitches of the holes 19, as shown in FIG. 11D, to make a frame area of 30 mm×40 mm available for exposure through the exposure opening 7.

To change frame sizes, the system controller 8 controls the motor 10 as follows: When switching from an NTSC-matched full-frame size to an HDTV-matched full-frame size, the photographic film 1 is first driven for seven pitches of the holes 19 and is then driven for one additional hole pitch. When switching from an HDTV-matched full-frame size to an NTSC-matched full-frame size, the photographic film 1 is first driven forward for nine pitches of the holes 19 and is then driven backward for one pitch.

When changing frame sizes, the photographic film 1 may be driven for a different distance or a different number of pitches, such as ten pitches of the holes 19, as shown in FIG. 11E. In this manner, the photographic film 1 may be easily exposed in many different frame sizes.

As shown in FIGS. 11A through 11E, the system controller of the photographic camera controls the feeding of the photographic film 1 such that the photographic film 1 will not be exposed in overlapping frames, even when different frame sizes are exposed.

The procedure described in relation to FIGS. 11A–11E applies equally to the magnetic marks 19' present on the film shown in FIGS. 4A and 4B.

FIGS. 1 and 2 illustrate the photographic film 1 whose effective exposure areas have been exposed in frames 3 of different sizes. In FIG. 1, the photographic film 1 has been exposed in an HDTV-matched full-frame size, having a width of 30 mm, a length of 53.3 mm, and aspect ratio of 9:16, and in an NTSC-matched full-frame size, having a width of 30 mm, a length of 40 mm) whose aspect ratio is 3:4. The holes 19 defined along the upper marginal edge of the photographic film 1 have a pitch of 5.25 mm.

In FIG. 2, the photographic film 1 has also been exposed in an HDTV-matched full-frame size and an NTSC-matched full-frame size, however, unlike FIG. 1, the holes 19 defined in the upper marginal edge of the photographic film 1 have a pitch of 6.28 mm. In FIG. 2, one frame of an HDTV-matched full-frame size corresponds to nine pitches of the holes 19, and one frame of an NTSC-matched full-frame size corresponds to seven pitches of the holes 19. Since these pitches are odd-numbered, a hole 19 may be positioned in alignment with the center of the frame, so that the center of the frame can easily be detected.

As shown in FIGS. 5 and 8, the photographic camera has a shutter release button 37. When the shutter release button 37 is depressed, the system controller 8 controls the size of the exposure area and supplies a control signal to a mark recording circuit 38 for recording a central mark, a so-called effective exposure area position signal, indicative of the center of the frame 3 and also supplies a control signal to a frame number recording circuit 39 for recording a frame number. The mark recording circuit 38 energizes an LED 40 positioned at the lower film-guide pair 30, 31 for recording a central mark 40a, shown in FIGS. 1 and 2, representing the center of the exposed frame 3. The frame number recording circuit 39 energizes an LED 41 positioned at the lower film guide pair 30, 31 for recording a frame number 41a, shown in FIGS. 1 and 2, representing the frame number of the exposed frame 3. The frame number 41a can be recorded such that it agrees with an actual frame number.

Figure 12:
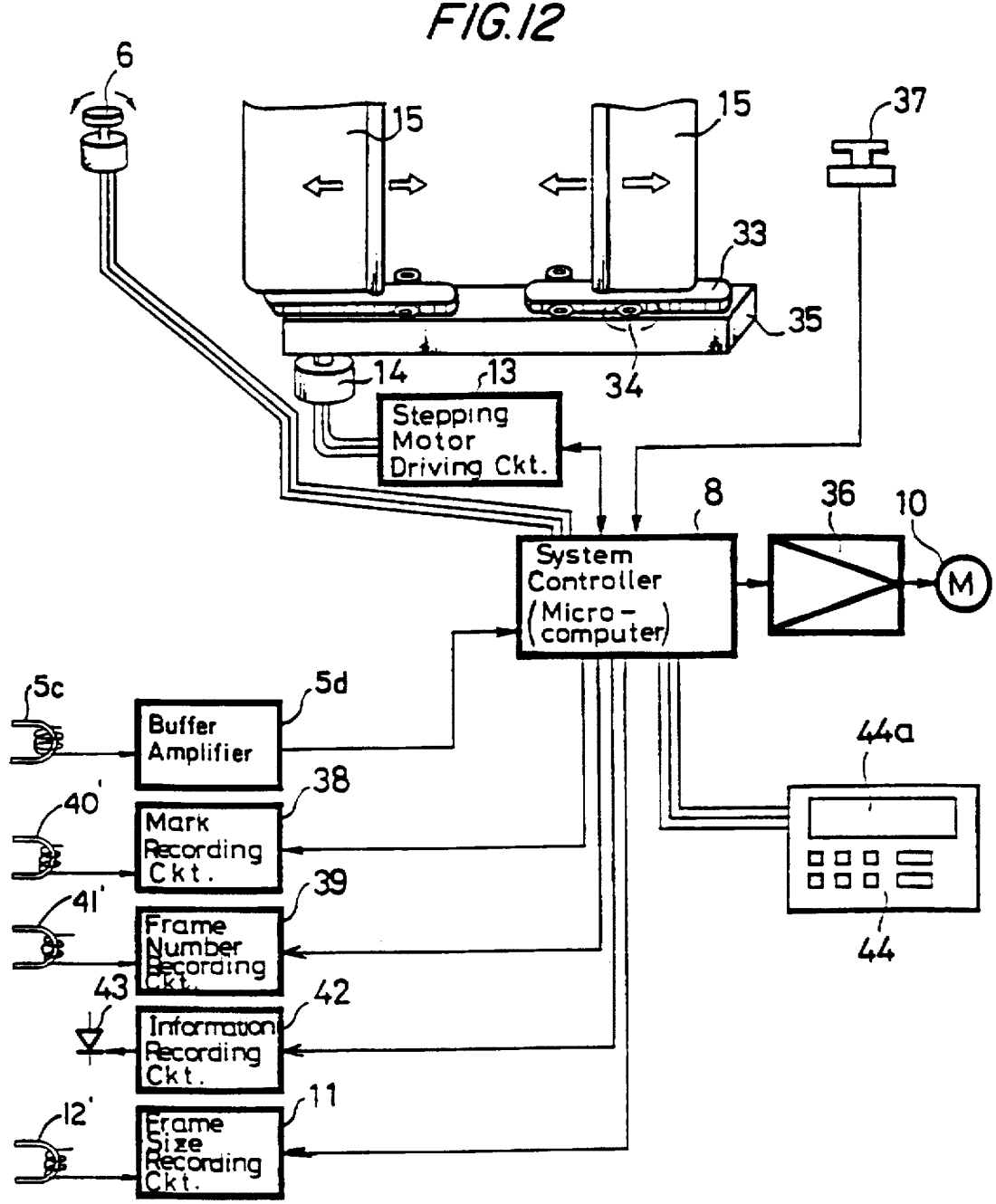
FIG. 12 is a block diagram of a control system for the other embodiment of the 35-mm photographic camera according to the present invention using the film of FIGS. 4A and 4B.

Alternatively, as shown in FIG. 12 in place of LED 40 a magnetic head 40' can be employed to record the center mark on the marginal area 19" on the unexposed film. Similarly, the frame number can be recorded using another magnetic head 41'.

The system controller 8 also supplies a control signal to a frame size recording circuit 11 for recording a frame size signal, a so-called effective exposure area width signal, indicative of the frame size of the exposed frame 3. The frame size recording circuit 11 energizes an LED 12 positioned at the lower film guide pair 30, 31 for recording a frame size signal 12a, shown in FIGS. 1 and 2.

Alternatively, as shown in FIG. 12, in place of LED 12 a magnetic head 12' can be employed to record the frame size signal on the marginal area 19" on the unexposed film.

The magnetic head 5c that senses the magnetic marks 19' on the film shown in FIGS. 4A and 4B is connected to the system controller 8 through a buffer amplifier 5d or a similar playback amplifier.

The LED 12 may be composed of four LED elements which are selectively energized to record one of the frame size signals 12a, which represent the frame size set by the frame size setting switch 6. The various frame size signals 12a are shown by way of example in Table 2 below.

TABLE 2

| Frame Size | Frame size signal 12a |
| --- | --- |
| HDTV-matched full-frame size | I I I I |
| NTSC-matched full-frame size | I I I |
| NTSC-matched half-frame size | I I |
| HDTV-matched half-frame size | I |

The central mark 40a and the frame size signal 12a supply information regarding the frame position and the frame size to an automatic printer, described hereinbelow, for controlling the automatic printer when the exposed and processed film is printed.

While frame sizes can be recognized by measuring the distances between adjacent central marks 40a when the exposed film is printed, the processing speed of the automatic printer can be increased by using the frame size signal 12a.

At the same time that the photographic film 1 is exposed, the system controller 8 supplies an information signal to an information recording circuit 42 for recording desired information The information recording circuit 42 energizes an LED 43 positioned at the upper film guide pair 30, 31 for recording such information 43a on the lower marginal edge, shown in see FIGS. 1 and 2, of the photographic film 1. The information 43a may be information that is supplied from the camera lens and the camera itself upon exposure or could consist of the exposure date, the person who took the picture, an exposure condition, or other information that the user has entered through an input device 44, such as a keypad, on the outer surface of the rear lid of the camera body 10. The amount of information 43a, that is, the number of characters that can be recorded, is dependent upon the frame size, and is displayed on a display panel 44a of the input device 44. The LED 43 has a number of LED elements that are selectively energized depending on the frame size.

An analysis has been made to determine the optimum position where the information 43a should be recorded and the optimum position where the holes 19 or magnetic marks 19' are defined from the standpoints of the user's convenience and a psychological effect that those positions have on the user. The results of the analysis are as follows:

(1) If marginal edges outside of the effective exposure area of the film are available as a band for recording user's information then the information should more preferably be positioned on the lower marginal edge of the print paper, rather than on the upper marginal edge.

(2) Study of the developing and printing processes in processing laboratories indicates that in many cases information about the film itself is printed in many cases on film negatives, such that the film information will be positioned on the upper marginal edge of the print paper. It is preferable not to mix the film information and the band for recording user's information.

From the above results, it is preferable to position the film position detecting holes 19 upwardly of the effective exposure area of the film when it is exposed.

As described above with reference to FIGS. 5 through 8, the photographic camera according to the present invention has a detecting means 5a, 5b for detecting the feeding of the photographic film 1, a film control system 8, 9, 10 for controlling the distance by which the photographic film 1 moves and for driving the photographic film 1 for a length corresponding to the width of the selected exposure opening 7, based on a detected signal from the detecting means 5a, 5b, and for controlling a signal recording device 8, 11, 12, 38, 40 disposed near the exposure opening 7 for recording a signal indicative of the position of the exposure opening 7 on the photographic film 1 when the photographic film 1 is exposed through the exposure opening 7.

After the photographic film 1 is exposed using the photographic camera, the processed photographic film 1 bears control signals that are recorded in a signal recording area 21, shown in see FIG. 1, thereof and that will be used when the photographic film 1 is printed. Therefore, even if the developed photographic film 1 contains frames of different frame sizes, it can be automatically printed by an automatic printer without requiring individual adjustment.

The photographic camera according to the present invention also has a film control system 8, 9, 10 for controlling the feeding or driving of the photographic film 1, and an opening control system 8, 13, 14, 15 for varying the width of the exposure opening 7 along the photographic film 1. At least when the width of the exposure opening 7 changes from a smaller dimension to a larger dimension, the film control system 8, 9, 10 drives the photographic film 1 for a length corresponding to the selected width of the exposure opening 7.

Therefore, the width of the exposure opening 7 is variable, and the take-up or driving of the photographic film 1 is controlled depending on the width of the exposure opening 7. The photographic camera can expose the photographic film 1 successively in desired frame sizes which may differ one from another without adjacent frames overlapping each other.

As shown in FIG. 1, the photographic film 1 used in the photographic camera according to the present invention has a signal recording area 21 located between an effective exposure area 20 and a marginal edge thereof for magnetically or optically recording control signals, which will be used when the photographic film 1 is processed and printed. The film 1 has holes 19 or magnetic marks 19' defined in an upper marginal edge area thereof between the effective exposure area 20 and the marginal edge for detecting the distance by which the photographic film 1 has been moved.

Figure 13:
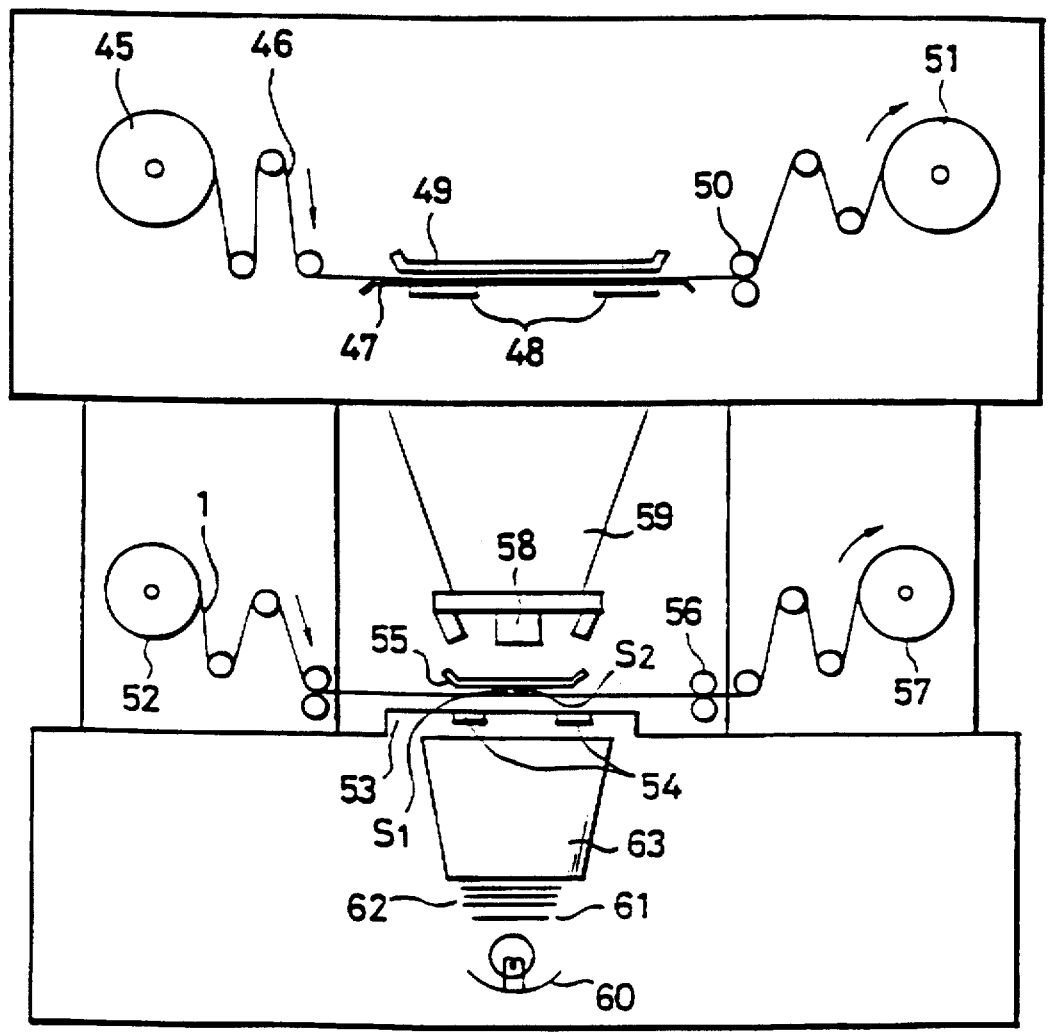
FIG. 13 is an elevational view of an automatic printer for printing on photosensitive paper a processed 35-mm film that was exposed using the embodiment of the 35-mm photographic camera according to the present invention.

As shown in FIG. 13, an automatic printer for automatically printing processed photographic film 1 that has been exposed using a camera as described above has a printer body that supports a paper supply reel 45 for supplying the sensitized print paper 46, a paper deck or platen 47 for supporting the print paper 46 supplied from the paper supply reel 45, a variable paper mask 48 for determining the size of a print paper segment on which an image is to be printed, a paper holder plate 49 for holding the print paper 46 down against the paper deck 47, a paper feed or drive roller 50 for driving the print paper 46, and a paper takeup reel 51 for winding the exposed print paper 46.

The printer body of the automatic printer also supports a film supply reel 52 for supplying the processed photographic film 1, a film deck or platen 53 for supporting the photographic film 1 supplied from the film supply reel 52, a negative-carrier variable slit 54, a negative holder plate 55 for positioning the negative down against the film deck 53, a film feed or drive roller 56 for driving the photographic film 1, a film takeup reel 57 for winding the exposed and processed photographic film 1, a lens 58 positioned above the negative holder plate 55, a bellows 59 supporting the lens 58 and positioned below the paper deck 47, a lamp 60 disposed below the film deck 53, a black shutter 61 positioned above the lamp 60, a filter assembly 62 composed of yellow, magenta, and cyan (Y, M, C) filters, and a diffusion box 63 disposed between the filter assembly 62 and the film deck 53.

The negative holder plate 55 supports a frame size sensor S1 for detecting the frame size signal 12a recorded on the photographic film 1, a frame center sensor S2 for detecting the central mark 40a recorded on the photographic film 1 that indicates the center of a frame, and an order sensor S3 for magnetically detecting order information about a print size and number of prints being ordered. This order information is recorded in the other marginal area opposite the one defined by the holes 19 or magnetic marks 19', 19", as shown in FIGS. 1-4.

Upon detection of the central mark 40a of the frame 3 with the frame center sensor S2, the film drive roller 56 is controlled to drive the film to align the frame center with the center of the negative-carrier variable slit 54. The variable paper mask 48 and the negative-carrier variable slit 54 are controlled based on the frame size signal 12a that is detected by the frame size sensor S1.

Figure 18A:
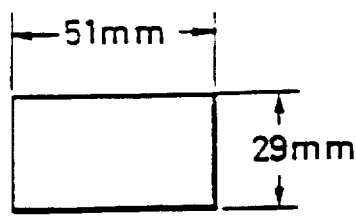
FIGS. 18A and 18B are representative of the relative sizes of negative-carrier variable slits in the automatic printer.
Figure 18B:
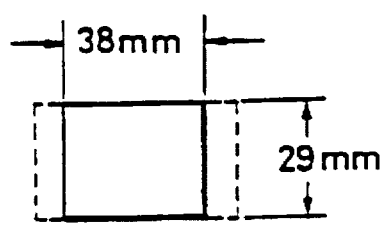
Figure 19A:
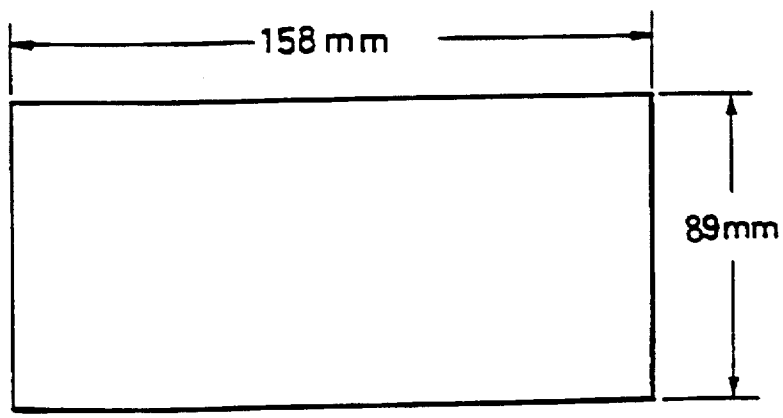
FIGS. 19A and 19B are representations showing the relative sizes of variable paper masks in the automatic printer.
Figure 19B:
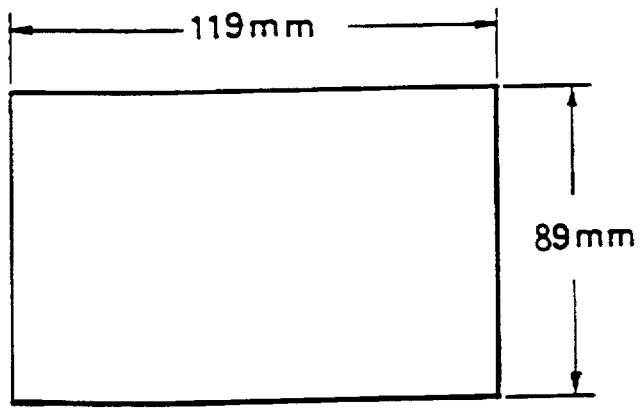

If the frame size is an HDTV-matched frame size, for example, the negative-carrier variable slit 54 is set to dimensions as shown in FIG. 18A, and the variable paper mask 48 is set to dimensions as shown in FIG. 19A. If the frame size is an NTSC-matched frame size, for example, the negative-carrier variable slit 54 is set to dimensions as shown in FIG. 18B, and the variable paper mask 48 is set to dimensions as shown in FIG. 19B.

Figure 14:
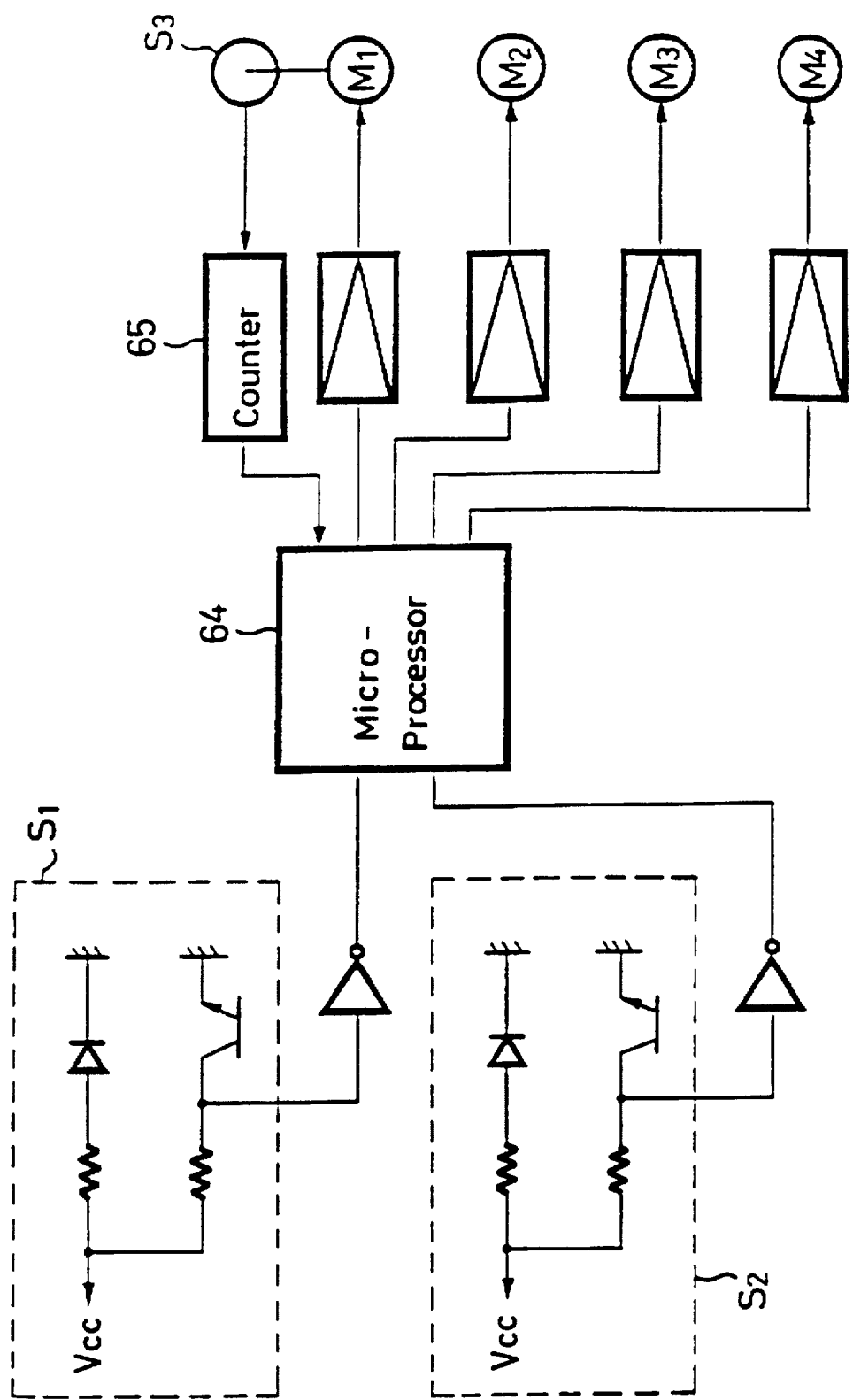
FIG. 14 is a block diagram of a control system used in the embodiment of the automatic printer shown in FIG. 13.

A control system for the automatic printer is shown in FIG. 14, in which the frame size sensor S1 and the frame center sensor S2 comprise photocouplers, respectively, for detecting the frame size signal 12a and the central mark 40a, respectively, that are recorded in the marginal edge area of the photographic film 1.

Figure 15:
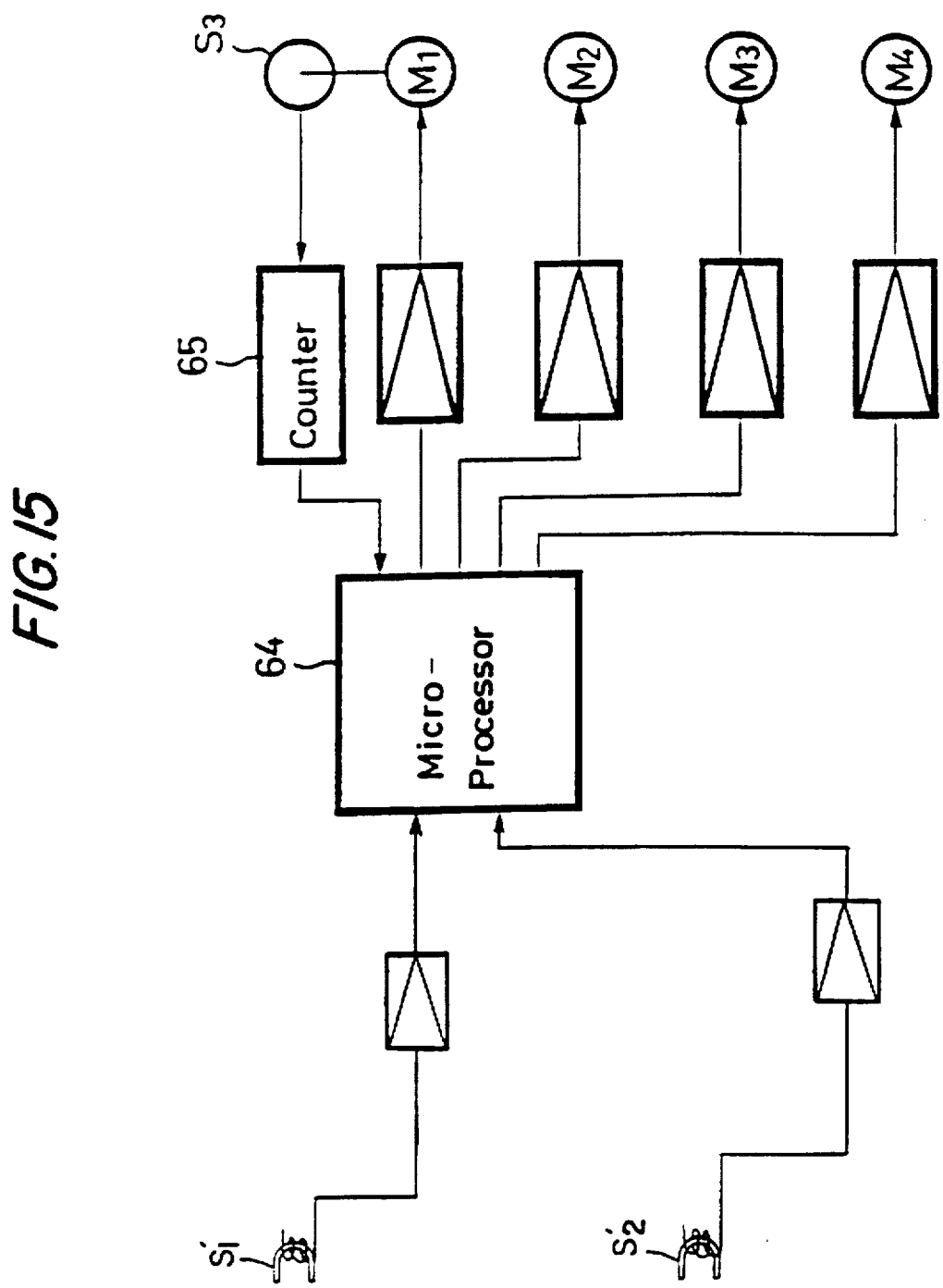
FIG. 15 is a block diagram of a control system for another embodiment of the printer according to the present invention.

On the other hand, the optical sensors S1 and S2 may be comprised of respective magnetic heads S1' and S2', as shown in FIG. 15, that read the frame size signal and the frame center signal that are magnetically recorded on the marginal area 19" of the unexposed film.

The frame center is determined based on the central mark 40a detected by the frame center sensor S2, and the frame size of the frame 3 whose frame center is determined by a microprocessor 64 of the control system based on the frame size signal 12a that is read by the frame size sensor S1 before the central mark 40a is detected by the frame center sensor S2. Then, the microprocessor 64 controls a mask size drive motor M3 to actuate the variable paper mask 48 to conform with the determined frame size. At the same time, the microprocessor 64 controls a negative-carrier variable slit drive motor M2 to actuate the negative-carrier variable slit 54.

Based on the frame size signal 12A read by the frame size sensor S1, the microprocessor 64 controls a film feed motor M1 to rotate the film feel roller 56 for feeding the photographic film 1 for a predetermined length. At the same time, the microprocessor 64 controls a paper feed motor M4 to rotate the paper feed roller 50 for thereby feeding the print paper 46 for a predetermined length. Based on the print size and print quantity information being read by the order sensor S3, the microprocessor 64 controls the number of prints and changes the size of the image on the sensitized print paper. This paper change system may be comprised of a paper feed mechanism and an optical selecting instrument, which are not shown. In such a system the optical selecting instrument selects a corresponding paper feed mechanism operation in response to the print size signal.

Figure 16:
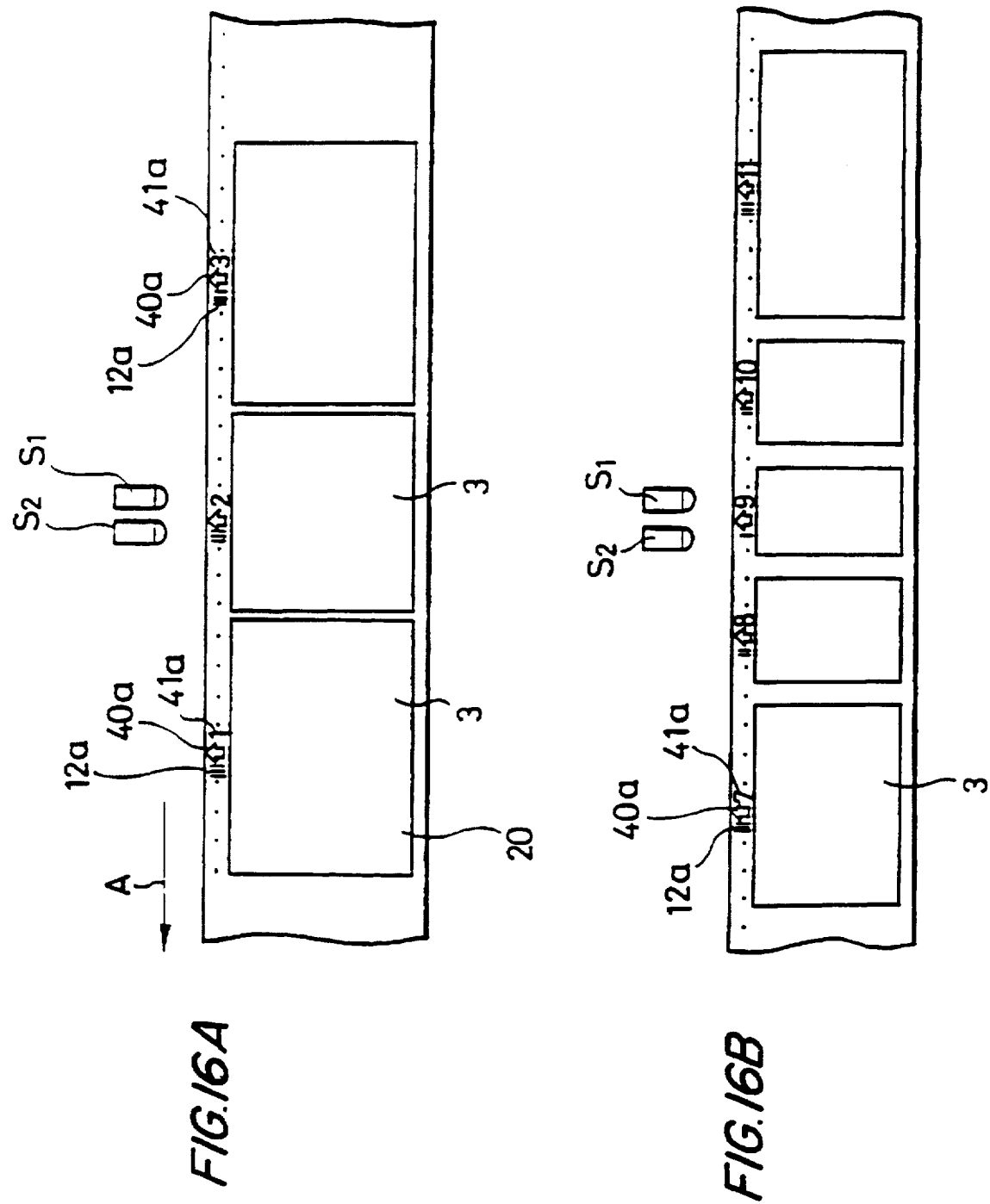
FIGS. 16A and 16B are fragmentary front elevational views showing the relationship between a 35-mm film and sensors in the automatic printer shown in FIG. 13.

FIGS. 16A and 16B show the relationship between the photographic film 1, the frame center sensor S2, and the frame size sensor S1 in the automatic printer. When the photographic film 1 is driven in the direction indicated by the arrow A in FIG. 16A, a frame size indicator 12a is detected by the frame size sensor S1 before its frame 3 is positioned and the sensor S1 output signal is used for controlling the driving of the photographic film 1, the negative-carrier variable slit 54, and the variable paper mask 48. The frame size signal from sensor S1 is processed by the microprocessor 64, which determines the frame size when the frame center of the frame 3 is determined by the frame center sensor S2.

As shown in FIGS. 16A and 16B, the central mark 40A indicative of a frame center is recorded at each frame on the photographic film 1. At each frame, the frame size indicator 12a is recorded ahead of the central mark 40a, and the frame number 41a is recorded behind the central mark 40a with respect to the direction in which the photographic film 1 is driven.

While the frame center sensor S2 and the frame size sensor S1 are shown as being located in substantially the same position, only the frame center sensor S2 should be positioned in alignment with the center of the negative-carrier variable slit 54 and the variable paper mask 48, and the frame size sensor S1 may be positioned on the film deck 53 at the entrance end thereof. This applies to the magnetic head sensors S1' and S2' as well.

Figure 17:
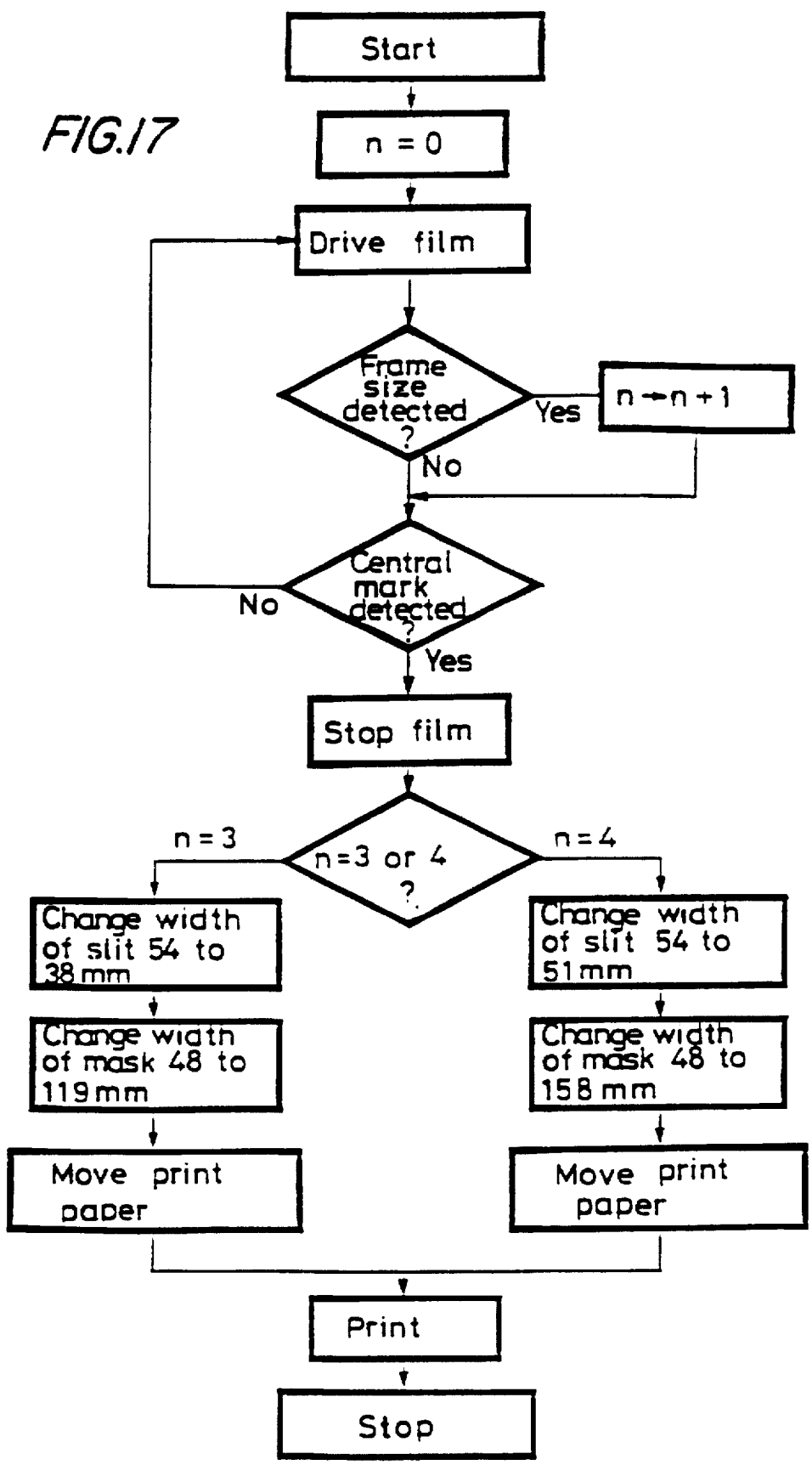
FIG. 17 is a flowchart of an operating method that is performed by a microprocessor of the control system shown in FIG. 14.

FIG. 17 shows a control sequence of the microprocessor 64 for controlling the driving of the developed photographic film or negative 1 and the driving of the print paper 46. The negative-carrier variable slit 54 and the variable paper mask 48 are also controlled in this control sequence. The photographic film 1 is continuously driven and taken up until the central mark 40a is detected by the frame center sensor S2, and then the photographic film 1 is stopped when the central mark 40a is detected by the frame center sensor S2. Until the photographic film 1 is stopped, the frame size indicator 12a is detected by the frame size sensor S1 and its number is counted.

If the frame size indicator 12a represents "3", the width of the negative-carrier variable slit 54 is set to 38 mm, and the width of the variable paper mask 48 is set to 119 mm. Thereafter, the print paper 46 is moved, and the photographic film 1 is printed, after which the control sequence is ended. The print paper 46 is moved for a distance corresponding to printed frame sizes, a blank surrounding the printed frames, and a cutting blank between the printed frames. Usually, a hole is defined in the cutting blank when the photographic film 1 is printed, and serves as a positional signal for automatically cutting the print paper.

If the frame size indicator 12a represents "4", the width of the negative-carrier variable slit 54 is set to 51 mm, and the width of the variable paper mask 48 is set to 158 mm. Thereafter, the print paper 46 is moved, and the photographic film 1 is printed, after which the control sequence is ended.

If the frame size indicator 12a represents "1" or "2", the widths of the negative-carrier variable slit 54 and the variable paper mask 48 are set similarly. Thereafter, the print paper 46 is moved, and the photographic film 1 is printed, after which the control sequence is ended.

Since the frame size indicator 12a is recorded in the upper marginal edge portion of the photographic film 1, it may possibly be recognized in error as the central mark 40a. To avoid such an error, a negative feed sensor S3, shown in FIG. 14, for detecting the distance by which the photographic film 1 is fed is associated with the film feed motor M1, and the distance by which the photographic film 1 is fed is measured by a counter 65 whose count is fed back to the microprocessor 64. Since the width of the frame size indicator 12a on the photographic film 1 can be detected by the distance by which the photographic film 1 is driven, the frame size indicator 12a can be distinguished from the central mark 40a or the frame number 41a.

As described above with reference to FIGS. 13, 14, and 16A–16B, the automatic printer according to the present invention has a film drive control device 65, 64, M1 for detecting an effective exposure area position indicator 40a recorded in a marginal edge area between the effective exposure area 20 on the photographic film 1 and the marginal edge thereof to control the driving of the photographic film 1, and a printing opening width control device 54, 64, M2 for detecting an effective exposure area width indicator 12a recorded in the marginal edge area to control the width of the printing opening along the photographic film 1.

The photographic film 1 has an effective exposure area position indicator 40a and an effective exposure area width indicator 12a which are recorded in a marginal edge area between the effective exposure area 20 on the photographic film 1 and the marginal edge thereof. After the effective exposure area width indicator 12a has been detected, the effective exposure area position indicator 40a is detected. The width of the film exposure opening along the photographic film 1, the width of the print paper exposure opening, and the distance by which the print paper 46 is driven are controlled based on the detected effective exposure area width indicator 12a, and the distance by which the photographic film 1 is fed is controlled based on the detected effective exposure area position indicator 40a.

Therefore, since the distance by which the photographic film 1 is driven is controlled based on the effective exposure area position indicator 40a recorded in the marginal edge area of the photographic film 1 and the width of the printing opening, the width of the print paper exposure opening and the distance over which the print paper 46 is driven are controlled based on the effective exposure area width indicator 12a recorded in the marginal edge area of the photographic film 1, the photographic film 1 can automatically be printed even if it has a succession of frames of different sizes.

Figure 20:
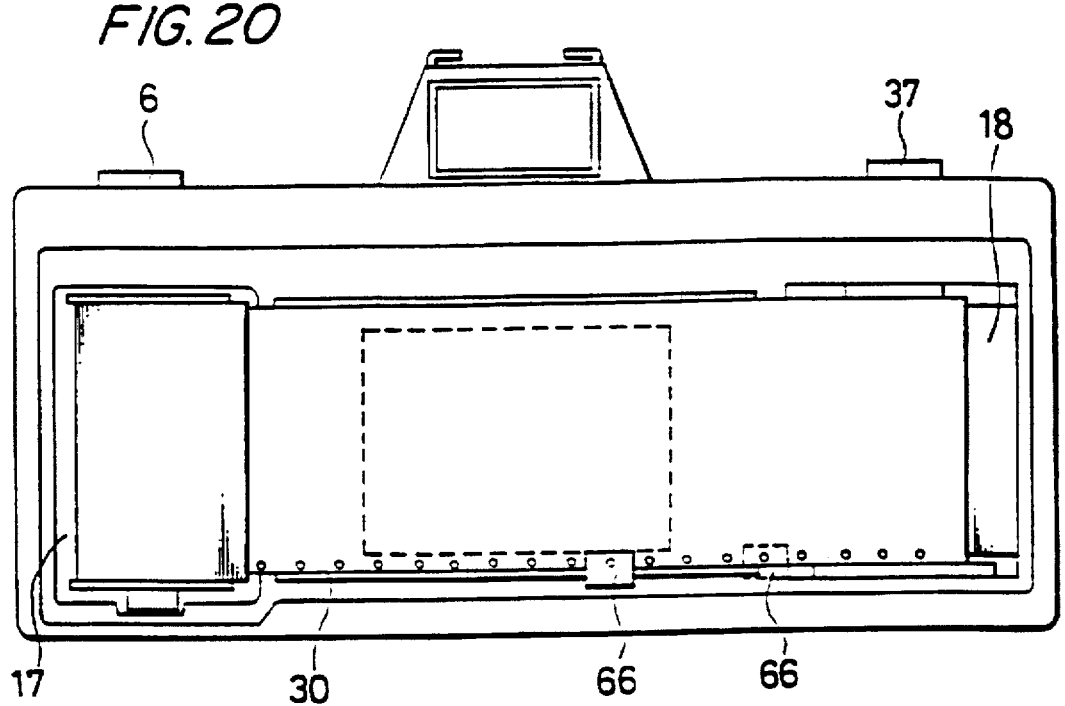
FIG. 20 is a rear elevational view of a 35-mm photographic camera with a rear lid removed, according to another embodiment of the present invention.
Figure 21:
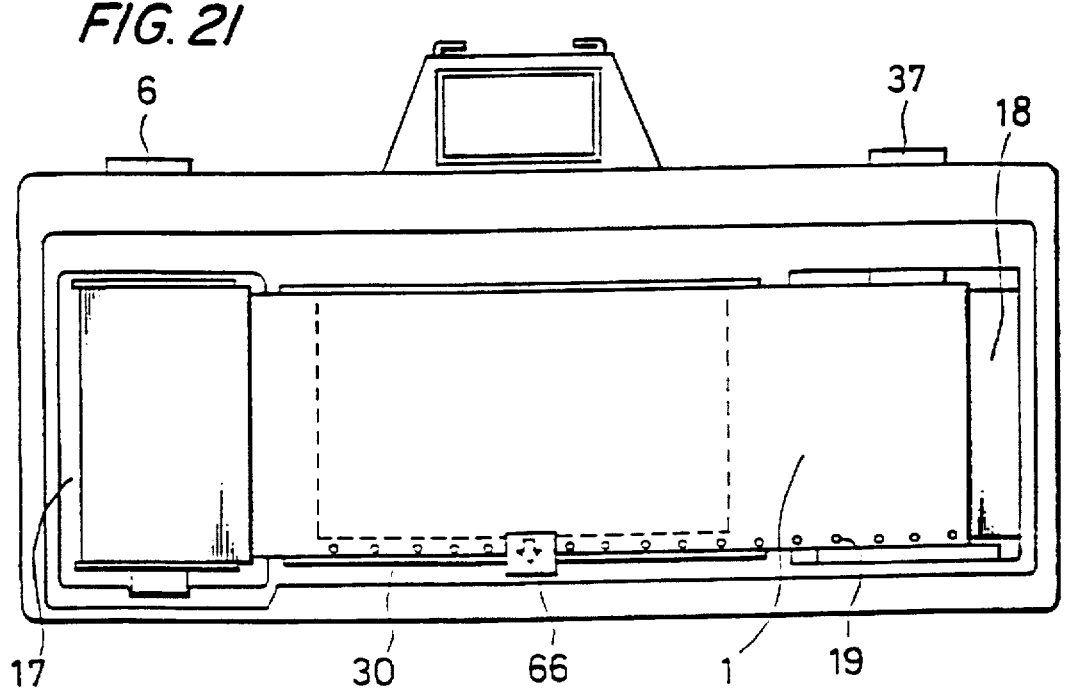
FIG. 21 is a rear elevational view of a 35-mm photographic camera with a rear lid removed, according to still another embodiment of the present invention.

In the illustrated photographic camera, the LED 5a and the photodetector 5b are disposed in confronting relationship to each other for detecting the film position detecting holes 19, however, as shown in FIGS. 20 and 21, a photocoupler 66, which is an integral combination of an LED and a photodetector for detecting a film position, may be disposed on a film guide 30. The photocoupler 66 may be positioned anywhere on the film guide 30. The photocoupler 66 may have LEDs 41, 40, as shown in FIG. 5, for recording the frame number 41a and the central mark 40a at the same time that the frame is exposed.

While the hole sensor 6 comprises an LED and a photodetector in the illustrated photographic camera, the hole sensor 5 may comprise two pairs of an LED and a photodetector given the different distances by which frames of different sizes are fed.

In the illustrated automatic printer, the same photographic film contain frames of different sizes, however, the present invention is also applicable to an automatic printer for automatically printing a spliced length of photographic films with different frame sizes.

An embodiment of a photographic image system 70 that can transform an image in a frame on the photographic film 1 to a video signal is shown and described in regard to FIGS. 22 through 30. This embodiment uses a printing order system which permits communication between the camera user and the processing laboratories.

Figure 22:
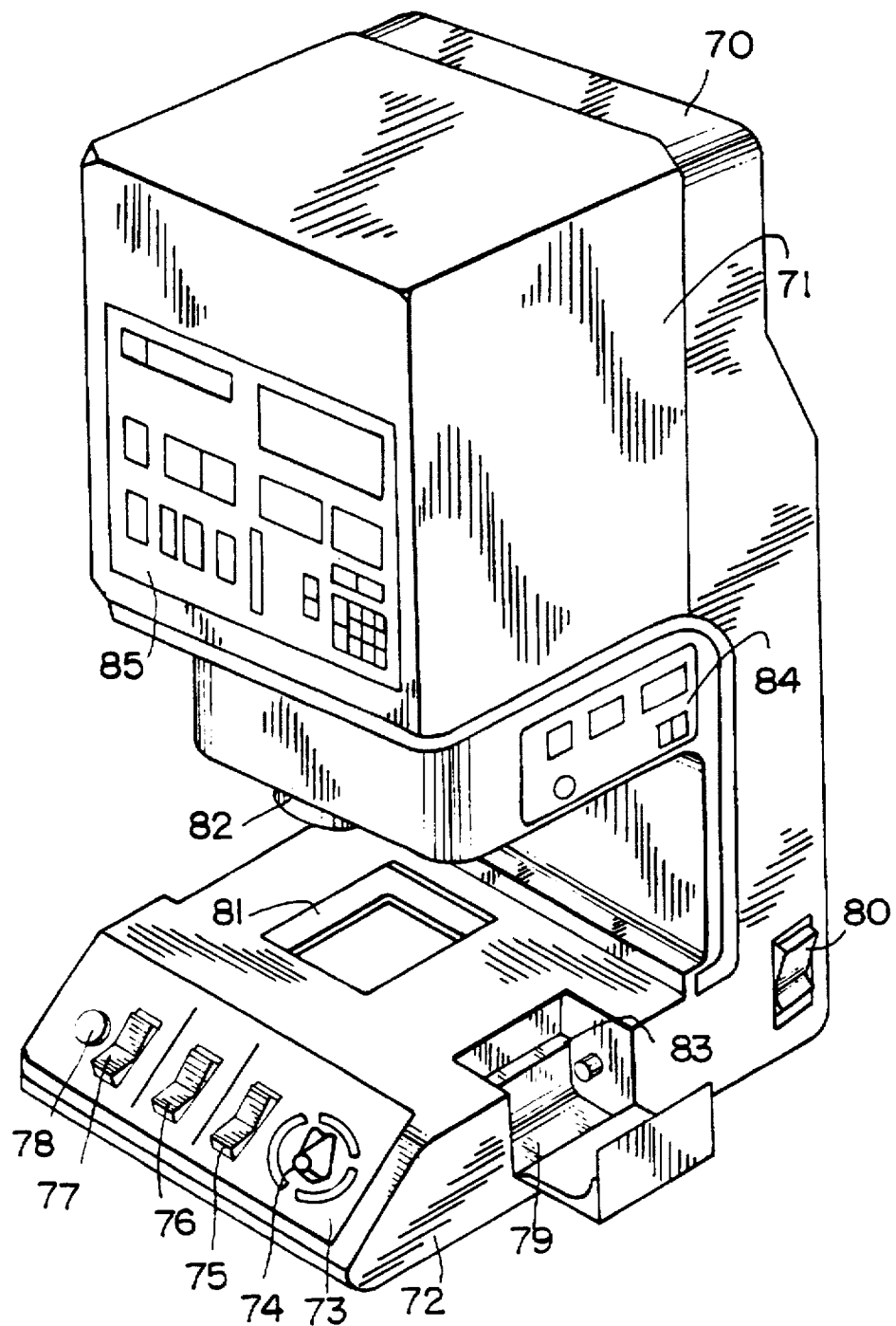
FIG. 22 is a perspective view of a photographic image system that can transfer a frame on a photographic film to a video signal according to an embodiment of the present invention.

FIG. 22 is a perspective view of the photographic image system 70 having an upper body 71 and a lower body 72. The upper body 71 has a print select panel 85 on a front surface that is described below, as well as a power display panel 84, and includes an optical instrument, a charge coupled device, and the necessary drive circuits.

Figure 23:
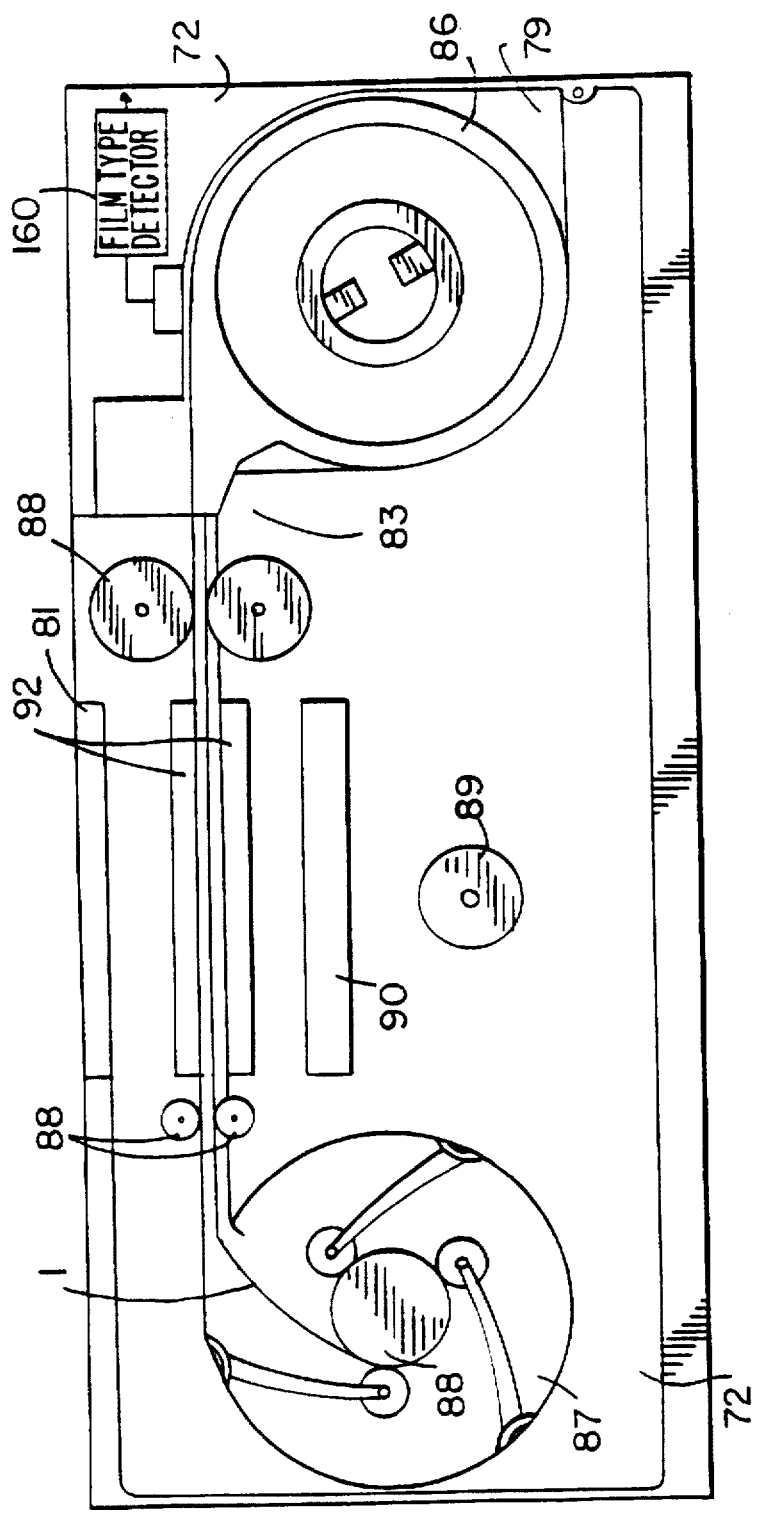
FIG. 23 is an elevational representation showing the film path looking into the lower body of the photographic and video system shown in FIG. 22.

The lower body 72 has a display adjusting panel 73, a film cartridge housing 79 and a window 81, and includes a lamp 89 and a film feed mechanism 88, as shown in FIG. 23. The display adjusting panel 73 has a color adjusting switch 74, a zoom control switch 75, a focus control switch 76, an iris control switch 77, and a main power indicator lamp 78. These switches 74 through 77 are manually used for adjusting the quality of the display image. The main power switch 80 is on the back right side of the lower body 72.

As shown in FIG. 23, a processed film cartridge 86 is accommodated in the film cartridge housing 79, and a processed film 1 is drawn out from the cartridge 86 and is guided by a film guide 92. The processed photographic film 1 is fed from the film cartridge housing 79 to a film housing 87 by the film feed mechanism 88. This film feed mechanism 88 includes driven roller pairs and idler roller pairs as well as a take-up reel mechanism and automatically feeds a film by detecting a frame position signal recorded on the film or by detecting holes placed in the film, as shown in FIGS. 16A and 16B. The processed photographic film is illuminated by the lamp 89 through the diffuse filter 90. The film feed mechanism 88 is driven by a motor 93 that is controlled by a film driving circuit 94 and a system controller 95, shown in FIG. 24. This system controller 95 controls the film feeding and film image transformation for transforming an image of the processed photographic film to a video signal. The system controller 95 detects the frame size signals 12a and frame center marks 40a using detectors 155, 156 and a hole/center mark detecting circuit 115. The frame center marks 40a may replace a hole 19 formed in a marginal edge of the photographic film.

Figure 24:
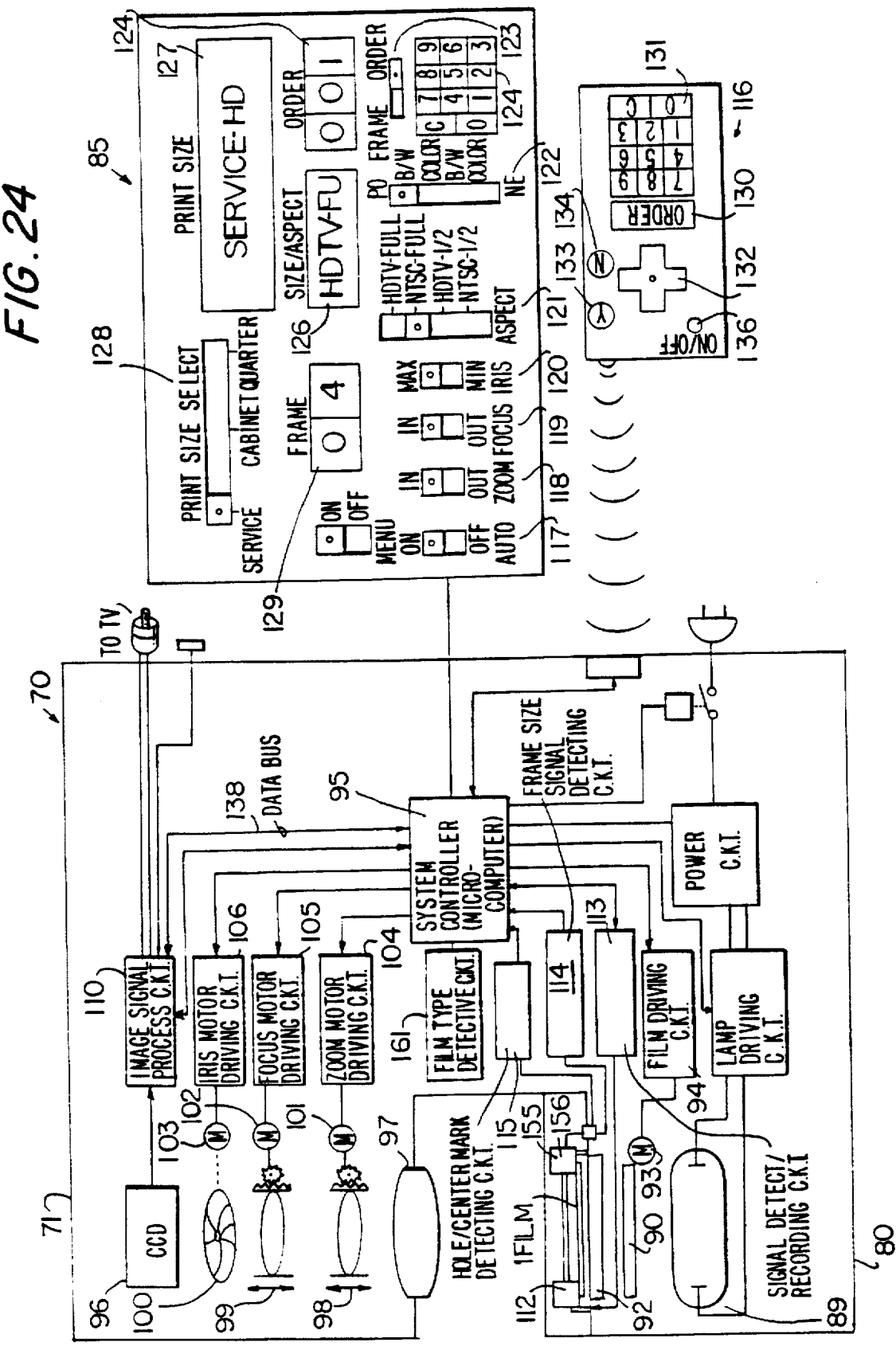
FIG. 24 is a schematic representation of the overall system of the photographic and video system shown in FIG. 22.

As shown in FIG. 24, an image of the processed photographic film is projected on a charge coupled device 96 through an objective lens 97, a zoom lens 98, a focus lens 99, and a diaphragm 100. These lenses and the diaphragm are driven by a zoom motor 101, a focus motor 102, and a diaphragm or iris motor 103, respectively. These motors are respectively controlled by a zoom motor circuit 104, a focus motor circuit 105, an iris motor circuit 106, and the system controller 95. The system controller 95 controls the diaphragm 100 in response to the magnification selected for the zoom lens 98.

Figure 25:
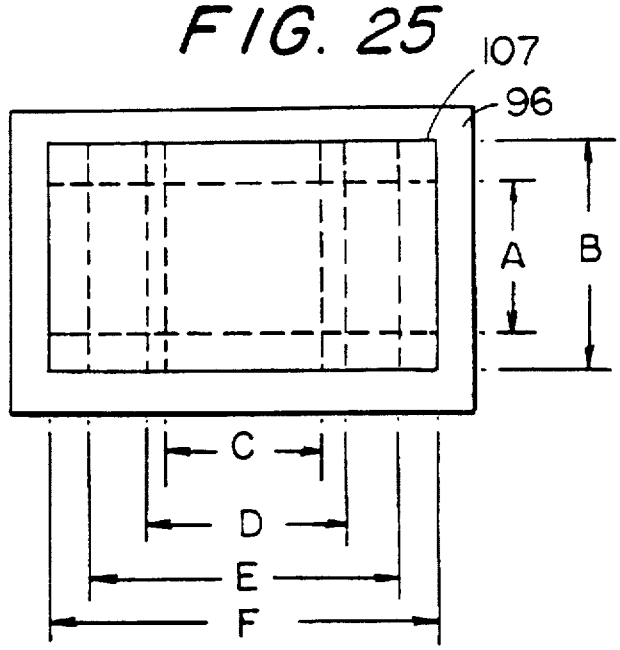
FIG. 25 is a plan view of the image transform area of a charge coupled device images used in the photographic and video system of FIG. 22.

As shown in FIG. 25, the image of the processed photographic film is projected on an image transform area 107 of the charge coupled device 96. The actual extent of this area is selected by the system controller 95 in response to a frame size signal 12a detected by the detector 94 and frame size signal detecting circuits 155, 156. Area sizes C through F correspond respectively to NTSC-matched frame size (half size), HDTV-matched frame size (half size), NTSC-matched frame size (full size), and HDTV-matched frame size (full size), and area sizes A and B may be selected by a full or panorama size signal in response to a user request or the frame size signal 12a recorded by a photographic camera.

Figure 26:
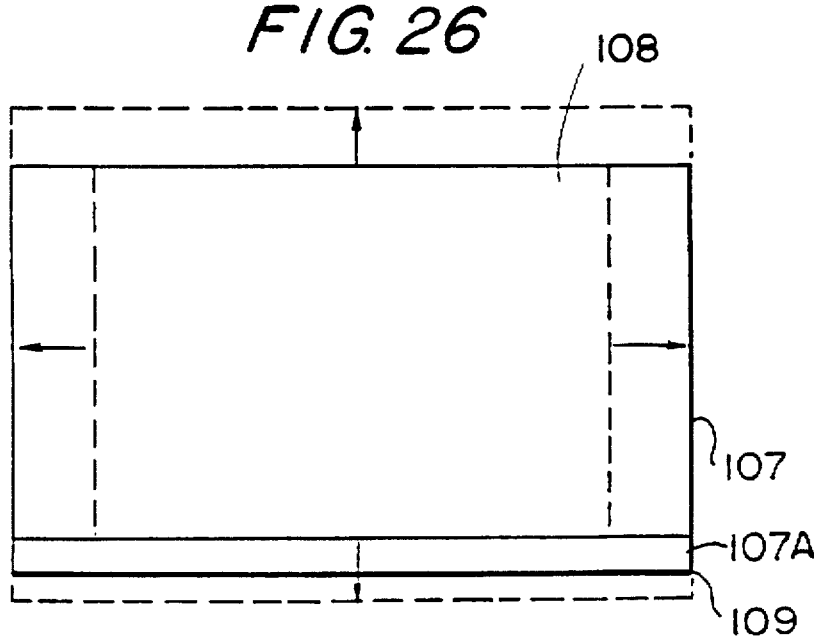
FIG. 26 is a plan view of the image transfer area on a larger scale.
Figure 30A:
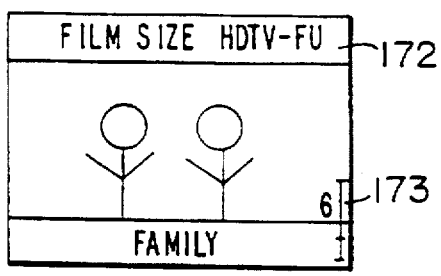
FIGS. 30A through 30D represent photographic superimpositions that are possible according to this embodiment of the present invention.

Another embodiment of the image area selecting system is illustrated in FIG. 26. The zoom lens 98 enlarges a NTSC-matched frame 108 size (full size) on the HDTV size area of the CCD image transform area 107. The enlarged NTSC-matched frame loses a part of the image but all pixels of the CCD image transform area 107 are effectively used. A portion 107A of the CCD image transform area is used to transform information, such as the user entered information 43a, in the marginal area of the photographic film to a video signal as shown in FIGS. 28 and 30A.

The system controller 95 controls an image signal process circuit 110 in response to an image signal detected by the charge coupled device 96 and in response to a frame size signal 12a. The image signal process circuit 110 generates an HDTV video signal or an NTSC video signal and other signals as well. These signal outputs are fed to a monitor or television 170, as shown in FIG. 27.

The photographic image system 70 is controlled by a remote controller 116. This remote controller 116 controls feeding of the film, the display size, and the printing order. The system controller 95 controls the image signal process circuit 110 to mix or insert a graphical order menu 171 onto the image obtained from the processed photographic film. This printing order is recorded on a magnetic area of the processed film by a magnetic head 112 and a signal detect/recording circuit 113, as shown in FIG. 24.

The print select panel 85 has an automatic mode select switch 117, and when this select switch is turned off, the user can manually control the operations by using switches 118 through 121. These switches 118–121 can manually control the zoom motor driving circuit 104, the focus motor driving circuit 105, and the iris motor driving circuit 106, respectively. A switch 122 selects a transform of the image signal process circuit which transforms a positive or negative image of the processed photographic film to a black-white or color video signal. A switch 123 selects an order menu or an ordinary display. A switch 128 selects the size of the photographic print that will be produced. Such sizes can be a service size, a cabinet size, a quarter size or some other size. A display 127 displays the selected size of the print paper, and a display 129 displays the number of the frame. In an order menu situation the displays 126, 124 and 127 display the size or aspect of the frame, the number of prints ordered, and the print size of the paper, respectively.

As shown in FIG. 28, the graphical menu 171 permits the order to be changed by the user. A first step A is an ordinary mode, which displays a film size 172 and the frame number 173 of the photographic film. A second step B is an order confirmation menu 174. A third step C is an order menu that displays a print size 175, number of prints 176, and a final confirmation of the order 177. This menu 171 is also controlled by the remote controller 116.

As shown in FIG. 24, the remote controller 116 has an order button 130 that selects an order situation menu, which is the second step B in FIG. 28. If a yes menu is selected by a yes button or a cursor switch 132 of the remote controller 116 in the second step B, the menu process jumps to the third step C. The cursor is then used to select the print size, the number of prints, and a final confirmation of the order.

The image signal process circuit 110 includes a digital converstion circuit and an image process circuit and output circuit, as shown in FIG. 29A. The conversion circuit has an analog to digital converter 139 for converting a CCD output signal, as shown in FIG. 24, or the output a line sensor of a flat-bed type scanner, as shown in FIGS. 31a and 31b, into a digital signal. Output data of this analog to digital converter 139 are RGB digital data.

This RGB data is corrected and converted by a brightness correction and color converting circuit 140. This circuit uses correction data and color converting data from a memory 141. The correction data is used to correct any transform deviations between various RGB detectors. The color converting data are for transforming from RGB data to CMK data, which is data for transforming between positive-film and negative film and data for selecting a color image or black/white image. The transformation between positive-film and negative film and a selection of a color image or a black/white image are selected by the switch 122 shown in FIG. 24, and the select data are sent through a data bus 138 from the system controller 95 to the image signal process circuit 110. The data bus sends control data for the brightness correct and color converting circuit 140 and for a film-type correction circuit 142. The transformed data from the brightness correct and color converting circuit 140 is fed to the next correction circuit 142.

This correction circuit 142 corrects a film sensitivity deviation for each film type by using sensitivity correcting data from a memory 143 and is controlled by the system controller 95. The system controller 95 detects the film type using the detector 160 disposed at the processed film cartridge housing 79. This film type detector 160 shown in FIG. 23 and a film type detecting circuit 161 shown in FIG. 24 detect the film type data that is magnetically or optically recorded on the film cartridge and send a film type data signal to the system controller 95. This detector 160 could also detect magnetic or optical data on the film, in which case it would be disposed on the film guide 92.

The CMK data for correcting the film sensitivity deviation are fed to an image process and output circuit 144. On the one hand this circuit 144 corrects a CRT deviation and adjusts a CRT display size and, on the other hand, the circuit 144 converts the CMK data to RGB data or to a composite video signal for a CRT display and superimposes the control data from the system controller 95 on the RGB data or the composite video signal. This circuit 144 also adjusts an image size of the CMK data corresponding to the frame size signal 12a and outputs signals to a computer system or a disc drive control circuit.

As shown FIG. 29B, this image process and output circuit 144 comprises two operational circuits. A first operational circuit outputs bit-map type data to the outer computer and comprises a transfer circuit 160, a data hold/process circuit 161, and a computer output circuit 162. This bit-map type data may be replaced by GIF type data, TIFF type data, or some other type data.

The transfer circuit 160 receives the CMK data for correcting the film sensitivity deviation and transfers the data to the hold/process circuit 161 and to a CRT deviation correct circuit 163. The data/hold process circuit 161 receives the CMK data and transforms the data type, the data size, and a display size. The data type is selected from the bit-map type, the GIF type data, the TIFF type data, JPEG type data, or some other type data by the image controller/ superimpose circuit 166.

The data size and the display size are selected by the image controller/superimpose circuit 166 according to the detected frame size signal 12a. The CMK data, processed and transformed as to data type, data size, and display size are held and transferred to the output circuit 162.

The transfer circuit 160 is also included in the second operational circuit. This second operational circuit is for outputting RGB data or a composite video signal to the CRT, LCD, or other display device and comprises the transfer circuit 160, the CRT deviation correction circuit 163, an image hold/process circuit 164, and a CRT output circuit 165. These block are controlled by an image controller/ superimpose circuit 166 and processes using data from the memory 165.

The CRT deviation correction circuit 163 corrects the CRT deviation using the CRT deviation data from the memory 165 and transforms the CMK Data into RGB data. The image hold/process circuit 164 receives the RGB data and processes an image superimposition onto the RGB data. The RGB data is controlled and adjusted to a display size by the image controller/superimpose circuit 166 according to the detected frame size signal 12a. The display data for superimposition are the film size 172, a number of the frame 173, and the order number information 176, as shown in FIG. 28. The image hold/process circuit 164 has two image planes. One image plane holds the RGB data and other image plane holds the superimpose data. These two image plane data are transferred to the output circuit 165 where they are mixed or superimposed with each other and transferred as RGB data or as a composite video signal.

Figure 30B:
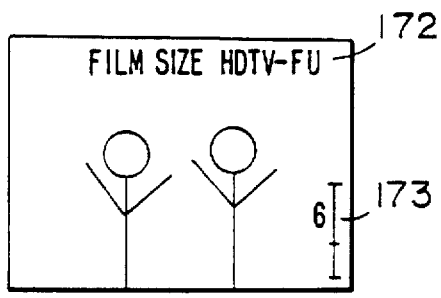
Figure 30C:
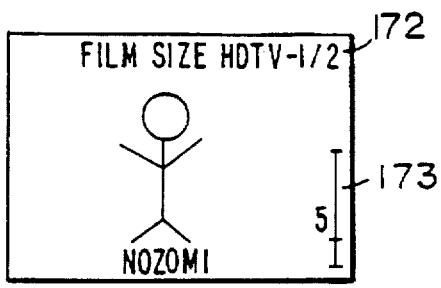
Figure 30D:
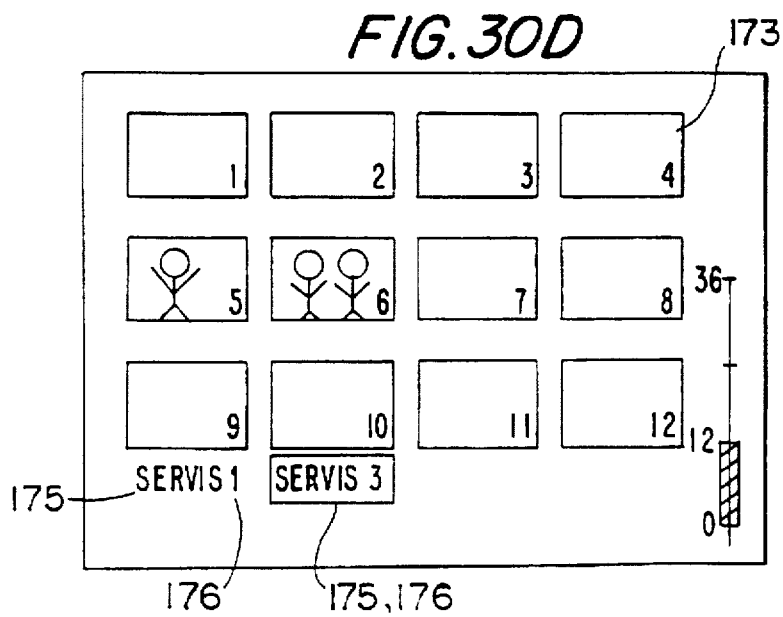

FIGS. 30A through 30D illustrates such an image superimposition. As shown in FIGS. 30A through 30C, an image of the photographic film can be selectively enlarged. The display data for film size 171, the number of the frame 173 and other data is superimposed on the image. FIG. 30D shows order confirmation windows by use by the operation in confirming the order information. This menu is displayed after the graphical menu 171 of the order as shown FIG. 28. On the screen of FIG. 30D, twelve windows are displayed corresponding to twelve exposures on the film. Each window continuously displays each frame of the processed photographic film 1. A display area below each window displays order information, such as print size 175 and the number 176 of prints to be made.

Figure 32:
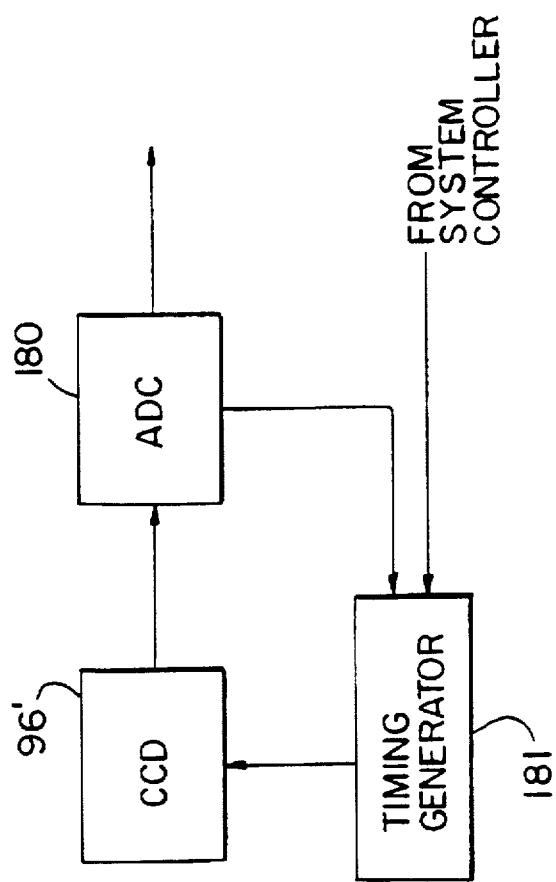
FIG. 32 is a schematic in block diagram form of electronic shutter circuit used in the system of FIGS. 31A and 31B.

Another embodiment of the photographic and video image system is shown in FIGS. 31A and 31B. The relationship of the lamp and the CCD are inverted in FIG. 31A relative to FIG. 24. This photographic image system is a line scanner type using a CCD 96' in the form of a line sensor. This line sensor 96' has an electronic shutter circuit shown in FIG. 32. This electronic shutter circuit comprises a timing generator 181 controlled by control data from the system controller 95 and by overflow data from an analog-digital converter 180. The timing generator 181 generates a variable width timing pulse at the CCD shutter pulse period. This pulse may be used in place of the diaphragm or iris 100 or together with the diaphragm or iris 100.

Referring back to FIGS. 31A and 31B the processed film 1 is driven by the film driving motor and illuminated by the lamp 89 and the diffuse filter 90. A glass window 81, the lamp 89, and the diffuse filter 90 are disposed in the lower body 72 of the photographic and video imaging system 70. The detectors 155, 156 for detecting a frame size 12a and a frame mark 40a and the recording/writing head 112 are disposed on opposite sides of the film 1 from the window 81. The frame center mark 40a may be replaced by a hole 19. The line sensor 96' and a lens 148 are disposed on a slider 149. The slider 149 is driven along a position rod 152 by a motor 150 and a belt 151.

The above two embodiments of the photographic image system relate to an automatic printer in which the photosensitive paper is replaced by a CCD. These two embodiments use an exposure control signal magnetically or optically recorded between an edge of the photographic film and an effective exposure area of the photographic film. These embodiments use the same position on the film for an order information area as in the previously explained embodiment, and this order information area is used by the automatic printer system at the time the photographic prints are made. The exposure control signal can be used not only by the processor but also by the user, and the user can print by a simple printer system according to the present invention. Such a home printing system can be combined with a computer system or a television for display.

The present invention uses an exposure control signal magnetically or optically recorded between an edge of the photographic film and an effective exposure area of the photographic film. This signal can be used not only by the processor but also by the individual user, so that the individual can print using a relatively simple printer system according to the present invention. This simple home system can be combined with a computer system or a television for display. Also, an exposure control signal of the present invention may include an auxiliary signal for controlling a printer system or indicating certain features to the user. Thus, the present invention as described above can be used for many applications because it avoids using the punched in notch required in previously proposed systems.

Having described preferred embodiments of the invention with reference to the accompanying drawings, it is to be understood that the invention is not limited to those precise embodiments and various changes and modifications could be effected by one skilled in the art without departing from the spirit or scope of the present invention, as defined in the appended claims.

What is claimed is:

1. A photographic image apparatus for transforming an image on a frame of a photographic film into an electrical image signal of said image, said apparatus comprising:

a body;

film feed means disposed in said body for feeding a photographic film;

image transforming means disposed in said body for transforming an image on a frame of said photographic film into an electrical image signal of said image;

first means disposed in said body for detecting a frame position signal on said photographic film and generating a position control signal;

second means disposed on said body for detecting aspect information non-mechanically recorded in a marginal area along an edge of said photographic film and generating an aspect control signal, said aspect information indicating an aspect of an area on said photographic film to be printed on a photographic paper; and control means for controlling said film feed means in response to said position control signal and for controlling said image transforming means to control an aspect of said electrical image signal depending on said aspect control signal.

2. A photographic image apparatus according to claim 1, wherein said image transforming means includes:

an image transformer device;

an optical system for projecting said image on said frame of said photographic film to said image transformer device; and a controller for controlling said optical system and adjusting a focus or a size of said image projected on said image transformer device in response to said aspect control signal.

3. A photographic image apparatus according to claim 1, wherein said control means generates a frame number signal, and said photographic image apparatus further includes superimposing means for superimposing said electrical image signal with said frame number signal.

4. A photographic image apparatus according to claim 1, wherein said image transforming means includes a charge coupled device and a switch controller for selecting an image area of said charge coupled device depending on said aspect control signal.

5. A photographic image apparatus for transforming an image on a frame of a photographic film into a video image signal of said image and outputting said video image signal, said apparatus comprising:

a body;

film positioning means disposed in said body for positioning a photographic film and for generating a frame number signal;

detecting means disposed in said body for detecting aspect information recorded on a marginal edge of said photographic film and generating an aspect information signal;

image transforming means disposed in said body for transforming an image on a frame of said photographic film into a video image signal of said image; and image processing means for electrically superimposing said aspect information signal and said frame number signal with said video image signal and for outputting a superimposed video image signal.

6. A photographic image apparatus according to claim 5, wherein said film positioning means includes:

a detector for detecting a frame position indicator on said photographic film and generating a position control signal;

a film feeder for positioning a frame of said photographic film with respect to said image transforming means; and a controller for controlling said film feeder depending on said position control signal and for generating said frame number signal.

7. A photographic image apparatus according to claim 6, wherein said frame position indicator is a hole, an optical mark, or a magnetic mark.

8. A photographic image apparatus according to claim 6, wherein said frame position indicator is an optical code or a magnetic code signal.

9. A photographic image apparatus according to claim 5, further comprising an interface for receiving a printing order signal and magnetic recording means for recording said printing order signal onto said photographic film.

10. A photographic image apparatus according to claim 9, wherein said image processing means superimposes said printing order signal with said video image signal.

11. A photographic image apparatus according to claim 5, further comprising a display means for receiving said superimposed video image signal from said superimposing means and for displaying a superimposed video image.

12. A photographic image apparatus according to claim 11, wherein said image processing means further includes a film information detector for detecting film information recorded on said photographic film, said image processing means correcting said video image signal depending on said film information.

13. A method of transforming a photographic image formed on a frame of a photographic film into an electrical image signal of said image and outputting said electrical image signal, said method comprising the steps of:

positioning a photographic film on a film positioning base;

detecting aspect information non-mechanically recorded in a marginal area along an edge of said photographic film, said aspect information indicating an aspect of an area on said photographic film to be printed on a photographic print paper;

generating an aspect information signal based upon said detected aspect information;

transforming an image recorded on said photographic film into an electrical image signal of said image;

generating a frame number signal for said electrical image;

superimposing said electrical image signal with said aspect information signal and said frame number signal; and outputting said electrical image signal superimposed with said aspect information signal and said frame number signal.

14. A method according to claim 13, further including the steps of:

detecting film information recorded on said photographic film;

generating a film information signal based upon said detected film information; and correcting said electrical image signal based upon said detected film information signal, wherein said step of superimposing superimposes a corrected electrical image signal with said aspect information signal and said frame number signal.

15. A method of transforming a photographic image formed on a frame of a photographic film to an electrical image signal and outputting said electrical image signal, said method comprising the steps of:

positioning a photographic film on a film positioning base;

detecting aspect information non-mechanically recorded in a marginal area along an edge of said photographic film, said aspect information indicating an aspect of an area on said photographic film to be printed on a photographic print paper;

generating an aspect information signal based upon said detected aspect information;

detecting film information non-mechanically recorded in a marginal area along an edge of said photographic film;

generating a film information signal based upon said detected film information;

converting a photographic image formed on a frame of said photographic film into an electrical image signal;

controlling parameters of said electrical image signal based upon said detected aspect information and said detected film information; and outputting said electrical image signal with parameters controlled based upon said detected aspect information and said detected film information.

\* \* \* \* \*